(12) United States Patent
Ishikawa et al.

(10) Patent No.: US 6,638,194 B2
(45) Date of Patent: Oct. 28, 2003

(54) DRIVE POWER TRANSMISSION APPARATUS

(75) Inventors: Yasuhiko Ishikawa, Tochigi-ken (JP); Masayuki Nagai, Fuji-ken (JP)

(73) Assignees: Tochigi Fuji Sangyo Kabushiki Kaisha (JP); Jatco TransTechnology Ltd. (JP)

( * ) Notice: Subject to any disclaimer, the term of this patent is extended or adjusted under 35 U.S.C. 154(b) by 0 days.

(21) Appl. No.: 09/957,322

(22) Filed: Sep. 19, 2001

(65) Prior Publication Data
US 2002/0035002 A1 Mar. 21, 2002

(30) Foreign Application Priority Data
Sep. 20, 2000  (JP) .......................... 2000-286056

(51) Int. Cl.[7] ............................................ B60K 17/344
(52) U.S. Cl. .................. 475/198; 475/216; 475/206; 180/248
(58) Field of Search ................ 475/216, 198, 475/206, 231; 180/248, 249

(56) References Cited

U.S. PATENT DOCUMENTS 5,718,148 A  * 2/1998  Bender ..................... 74/325
6,135,229 A  * 10/2000 Arimatsu ................. 180/248

FOREIGN PATENT DOCUMENTS

JP          8-21503        1/1996

* cited by examiner

Primary Examiner—Rodney H. Bonck
Assistant Examiner—Dennis Abedelnour
(74) Attorney, Agent, or Firm—Morrison & Foerster LLP

(57) ABSTRACT

A transmission apparatus (3) outputs drive power of a motor, from a speed changing mechanism (5, 7), via a sub-shaft (25), a power distribution apparatus (4) transmits rotation of an input end member (67) linked to the sub-shaft (25), via output shafts (83, 85), to the front-wheel end and the rear-wheel end, and the sub-shaft (25) and the power distribution apparatus (4) are disposed in an axially overlapping relationship.

18 Claims, 10 Drawing Sheets

DRIVE POWER TRANSMISSION APPARATUS

BACKGROUND OF THE INVENTION

1. Field of the Invention

The present invention relates to a drive power transmission apparatus in a four-wheel-drive vehicle, in which a drive power distribution apparatus is assembled within a sub-axle type transmission apparatus.

2. Related Art

Language in the Japanese unexamined patent application publication 8-21503 describes a sub-shaft toroidal type stepless transmission, denoted by reference numeral 1001 in FIG. 10 of the accompanying drawings.

The toroidal type stepless transmission 1001 is used in a dual-shaft drive vehicle, and has a torque converter 1003, a forward/reverse switching mechanism 1005, stepless transmission mechanisms 1007 and 1009, and an output unit 1011.

The drive power of a motor is transmitted from the torque converter 1003 to the forward/reverse switching mechanism 1005. The forward/reverse switching mechanism 1005 is formed by a planetary gear and multivane clutch or the like, and performs switching in accordance with the rotational direction of the transmitted drive power, being either forward or reverse, which is then transmitted to the stepless transmission mechanisms 1007 and 1009.

The stepless transmission mechanism 1007 has a pair of input disc 1013 and output disc 1015, a friction roller 1017, an input shaft 1019, and an output shaft 1021, and the stepless transmission mechanism 1009 has a pair of input disc 1023 and output disc 1025, a friction roller 1027, and also, in common with the stepless transmission mechanism 1007, has the input shaft 1019 and the output shaft 1021.

The input shaft 1019 is linked to the forward/reverse switching mechanism 1005, and the output shaft 1021 is disposed at the outer periphery of the input shaft 1019.

The input disc 1013, the output disc 1015, the input disc 1023, and the output disc 1025 are each disposed so that the profiles of the frictional surfaces thereof form a circle and are in mutual opposition, the input discs 1013 and 1023 are fixed to the input shaft 1019, and the output discs 1015 and 1025 are fixed to the output shaft 1021.

The friction rollers 1017 and 1027 are pressed up against the frictional surfaces of the input disc 1013 and output disc 1015, and the frictional surfaces of the input disc 1023 and the output disc 1025, respectively, drive power transmitted from the forward/reverse switching mechanism 1005 to the input shaft 1019 being transmitted via the friction rollers 1017 and 1027 by frictional forces developed at their frictional surfaces to the output discs 1015 and 1025 and causing the output shaft 1021 to rotate.

When the above occurs, if the friction rollers 1017 and 1027 are rocked so as to change the angle of inclination, there is a change in the radius of contact with each disc, so that, for example, if an inclination is imparted in a direction so that the radius of contact of the friction rollers 1017 and 1027 with the input discs 1013 and 1023 is increased and the radius of contact with the output discs 1015 and 1025 decreases, then the speed of the output shaft 1021 increases, and if the imparted inclination is in the reverse direction, then the speed of the output shaft 1021 is reduced.

The output unit 1011 has gear sets 1029 and 1031, a sub-shaft 1033, an idler (not shown), an output shaft 1035, and the like.

The gear set 1029 interconnects the output shaft 1021 and the sub-shaft 1033. The gear set 1031 is formed by a gear 1037 on the sub-shaft 1033, a gear 1039 on the output shaft 1035, and the idler that interconnects the gears 1037 and 1039, and serves for interconnection between the sub-shaft 1033 and the output shaft 1035.

The output shaft 1035 is disposed coaxially with respect to the torque converter 1003, the forward/reverse switching mechanism, and the stepless transmission mechanisms 1007 and 1009, and the sub-shaft 1033 is parallel to these elements.

Drive power output from the stepless transmission mechanisms 1007 and 1009 to the output shaft 1021 is sent to wheels from the gear set 1029, via the sub-shaft 1033, the gear set 1031, and the output shaft 1035.

As described above, the stepless toroidal transmission 1001 is used in a two-wheel-drive vehicle. For use in a four-wheel-drive vehicle, to reduce the size and weight of the vehicle and enable the achievement of a low-cost four-wheel-drive vehicle, a power distribution unit is combined with an existing transmission (as a speed change gear) for a two-wheel-drive vehicle.

In the case of the stepless toroidal transmission 1001, however, in which the output unit of a sub-shaft type transmission is made up of a sub-shaft 1033, a gear set 1031, and an output shaft 1035 and the like, if an input of the power distribution unit is linked to the output shaft 1035, both the axial length of the combined transmission and power distribution unit increases, and the combined weight increases.

With an increased axial length, it is necessary to make a change in the propeller shaft and casing (transmission case and power distribution unit case), thereby causing a great increase in cost.

Existing transmissions have idle gears and torque-adjusting gear sets and the like for the purpose of rotational direction adjustment. For example, there is a case in which a gear set corresponding to the gear set 1031 of the stepless toroidal transmission 1001 has gears 1037 and 1039 on the sub-shaft 1033 and the output shaft 1035, and an idle gear linked thereto, and a case in which this idle gear and the gear 1039 on the output shaft 1035 serve as a gear set for torque adjustment.

If the power distribution unit is assembled together with a transmission having such an idle gear or torque adjustment gear, because the idle gear or torque adjustment gear gives restriction to the mounting (connection) of the power distribution unit, in addition to an overall increase in size of the combined transmission and power distribution unit, it becomes difficult to achieve a reduction in cost.

SUMMARY OF THE INVENTION

Accordingly, it is an object of the present invention to provide a lightweight, compact, and low-cost power transmission apparatus, by combining various sub-shaft type transmission apparatuses with a power distribution apparatus.

More specifically, a first aspect of the present invention provides a power transmission apparatus comprising a transmission apparatus for outputting drive power of a motor from an input shaft, via a transmission mechanism disposed coaxially therewith, to a sub-shaft disposed in parallel thereto; and a power distribution apparatus disposed in parallel to the sub-shaft, for transmitting rotation of an input end member linked to an end of the sub-shaft, via respective output shafts, to a front-wheel end and a rear-wheel end, wherein at least the sub-shaft and the input end member are disposed in an axially overlapping relationship.

It is noted that in the present invention The phrase "the sub-shaft and the input end member are disposed in an axially overlapping relationship" means that, when the sub-shaft and the input end member are radially projected, their projections have mutually overlapping parts.

The "motor" as used above will be understood herein as meaning an internal combustion engine, or a motor converting electrical energy to rotative power.

In this manner, in the present invention, by linking an input end member to a sub-shaft of a sub-shaft type transmission apparatus, an existing power transmission apparatus for two-wheel driven vehicle is available to implement a power transmission for four-wheel driven vehicle.

Because at least the input end member of the power distribution apparatus has an axially overlapping relationship with the sub-shaft type transmission apparatus, it is unnecessary to change the axial dimension of the sub-shaft, or extremely suppressed, in addition to that the power transmission apparatus (power distribution apparatus and transmission apparatus) can be reduced by the overlapping dimension in the axial direction, allowing for the size to be compact, the weight to be prevented from being increased, and the mountability to be improved.

The interconnection between the sub-shaft disposed upstream in a drive power transmission route of the power distribution apparatus and the input end member of the power distribution apparatus does not involve the gear set 1031 and the output shaft 1035 in such a sub-shaft type transmission the conventional stepless toroidal transmission 1001, nor an idle gear or torque control gear.

Therefore, from the existing sub-shaft type transmission apparatus, simple power transmission members therein as such intermediate members as gear set 1031, output shaft 1035, idle gear, and torque control gear, are eliminated, having a reduced number of components, allowing for compact size, light weight, and low cost.

Changes or modifications more than removing those intermediate members, for example, such a change or modification as a change in size of the sub-shaft or a modification of the casing, are not necessitated nor possibly suppressed, so that the power transmission apparatus for four-wheel driven vehicle can be achieved with an extremely low cost, with an existing layout maintained.

The casing can be made compact in size in accordance with the compactness and lightweight of the power transmission apparatus, having a wall thinned and lightweighted with an improved rigidity.

According to a second aspect of the present invention, in a power transmission apparatus according to the first aspect, the power distribution apparatus and the sub-shaft are disposed in an axially overlapping relationship. There can be achieved like functions and effects to the first aspect.

Further, an entirety of the power distribution apparatus axially overlaps the sub-shaft, with commensurate compactness and enhancement of vehicle mountability.

According to a third aspect of the present invention, in a power transmission apparatus according to the first or second aspect, the sub-shaft and the input end member are linked via a speed changing mechanism, and the speed changing mechanism comprises a plurality of stages of gear sets operative for a speed change by an operation mechanism. There can be achieved like functions and effects to the first or second aspect.

Because the speed changing mechanism can be disposed in such a space as for the gear 1037 of the conventional gear set 1031, a speed changing function is available, making effective use of an existing space.

Because the speed changing mechanism can be formed simply by those members (gears) disposed on the input side member and the sub-shaft, without using members on other shafts, for example, idle gears, it is possible to have a low-cost arrangement with a reduced number of components, avoiding increase in weight or enlargement in radial direction.

In this manner, an existing space is available for installation of the speed changing mechanism, without needing provision of a new installation space, without the need of changing a conventional layout, thus allowing for implementation at a low cost.

Because the speed changing mechanism and the sub-shaft are disposed mutually coaxial, allowing disposition of, for example, a differential mechanism or coupling, it is possible to achieve a function therefrom, for example, a differential function or intermittent torque connecitng funtion, with a conventional layout maintained.

It is noted that the speed changing mechanism means a shift mechanism, such as a High-Low shift mechanism (hereafter called "Hi-Lo shift mechanism"), and a direction switch mechanism that switches between forward and reverse directions. The shift mechanism is not limited to a two-stage shift, and may be a plural-stage shift.

The Hi-Lo shift mechanism may preferably be used for a sub-shift gear set in a four-wheel driven vehicle, such as an off-road vehicle.

According to a fourth aspect of the present invention, in a power transmission apparatus according to the third aspect, the speed changing mechanism has operation means disposed coaxially with the sub-shaft. There can be achieved like functions and effects to the third aspect.

Because the speed changing mechanism and operations therefor are disposed coaxially with the sub-shaft, it is possible to arrange the operation means in a space of the gear 1037 that constitutes the gearset 1031 of the stepless toroidal transmission 1001, for example.

In this manner, an existing installation space is available, avoiding a region in which components such as the speed changing mechanism are concentrated in the casing, without needing provision of a new installation space, without the need of changing a conventional layout, thus allowing for implementation at a low cost.

According to a fifth aspect of the present invention, in a power transmission apparatus according to any one of the first to fourth aspects, the power distribution apparatus has a differential mechanism for allowing differential rotation between the respective output shafts. There can be achieved like functions and effects to the first to fourth aspects.

In this configuration, drive power of the motor is transmitted by the differential mechanism to the the front and rear wheels, allowing for a full-time four-wheel driven vehicle to be implemented very compact.

In the case of a differential mechanism adjustable of a torque distribution ratio between front wheel end and rear wheel end (for example, in a gear type differential mechanism, by changing the front wheel end gear ratio and the rear wheel end gear ratio), the drive power distribution ratio between front and rear wheels can be set as desirable.

According to a sixth aspect of the present invention, in a power transmission apparatus according to the fifth aspect, a difference limiting mechanism for limiting the differential rotation of the differential mechanism is disposed coaxially with the power distribution apparatus. There can be achieved like functions and effects to the fifth aspect.

Because the difference limiting mechanism is disposed coaxially with the power distribution apparatus, interconnection between the different limiting mechanism and the differential mechanism is simplified in structure, allowing for the power transmission apparatus to be commensurately compact.

When the difference limiting mechanism is operated, or when differential rotation is locked by the difference limiting mechanism, wheels are prevented from skidding, thereby improving the ability of the vehicle to negotiate poor road surfaces, starting performance, acceleration performance, body stability, and direction stability.

By stopping the operation of the difference limiting mechanism, or by canceling the difference rocking, such vehicular characteristics as head direction changeability and turnability, as well as fuel consumption of the motor, can be improved.

By adjusting a difference limiting force of the diffrence limiting mechanism in accordance with variations such as of road surface condition, steering condition, and acceleration condition, it is possible to select an optimum condition between the effect of improvements, when diffrence is limited, such as in the ability of the vehicle to negotiate poor road surfaces, starting performance, acceleration performance, body stability, and direction stability, and the effect of improvements, when the difference is allowd, such as in head direction changeability and turnability, as well as in fuel consumption.

According to the seventh aspect of the present invention, in a power transmission apparatus according to the sixth aspect, the difference limiting mechanism comprises a clutch mechanism for locking the differential rotation. There can be achieved like functions and effects to the sixth aspect.

By a difference locking function of the clutch mechanism, even over a poor road surface or a low-$\mu$ road surface, the wheels are prevented from skidding, thereby improving the ability of the vehicle to negotiate poor road surfaces, starting performance, acceleration performance, body stability, and direction stability, and by cancellation of the difference locking, there allowed improvements of such vehicular characteristics as head direction changeability and turnability, as well as fuel consumption of the motor.

According to an eighth aspect of the present invention, in a power transmission apparatus according to the sixth or seventh aspect, the difference limiting mechanism is disposed serially to the power distribution apparatus. There can be achieved like functions and effects to the sixth or seventh aspect.

In accordance with a splitting structure and split location of a casing accommodating the power transmission apparatus, and a spacing between the casing and the difference limiting mechanism, as well as with whether interferencces are present or not between the difference limiting mechanism and vehicle body end peripheral members, the difference limiting mechanism is allowed to have the location for disposition selected for the assembly, with a facilitated implementation.

Operation means for the difference limiting mechanism may for example be a fluid pressure actuator, such as a hydraulic actuator, or an actuator using a magnet or an electric motor. Anyhow, in this arrangement in which the location for disposition of the difference limiting mechanism is selective in accordance with peripheral members and their layout, it is possible for example to serially dispose the difference limiting mechanism outside the differential mechanism, and in this case, pressure lines for the fluid pressure actuator and lead wires for the magnet or electric motor are prevented from interfering with the differential mechanism, with facilitated piping and wiring installation, with advantages in layout.

According to a ninth aspect of the present invention, in a power transmission apparatus according to any one of the first to fourth aspects, the power distribution apparatus comprises a coupling adapted at one output shaft end for normally transmitting drive power and at another output end for intermittently transmitting drive power as necessary. There can be achieved like functions and effects to the first to fourth aspects.

In this configuration, which employs a coupling smaller in size and lighter in weight than the differential mechanism, it is possible to improve the vehcile mountability, avoiding enlargement in size and increase in weight, when implementing a power transmission apparatus for four-wheel driven vehicle according to the present invention.

By using as the coupling a coupling of a torque control type in which an engagement force of a friction clutch is adjustable with a fluid pressure actuator such as a hydrauloic actuator or an actuator such as a magnet or electric motor, it is allowed to adjust drive power to be transmitted to wheels at one output end in dependance such as on a skidding condition (road surface condition) of wheels at another output end, running condition of the vehice, and steering condition, thereby improving the ability of the vehicle to negotiate poor road surfaces, starting performance, acceleration performance, and the like to a sufficient degree.

If the coupling to be used is a rotation difference sensitive type that transmits drive power in accordance with the rotation difference by the shearing resistance of a viscous fluid, as the skidding speed of a wheel increases at one end, the larger drive power is transmitted to a gripping wheel at the other end, allowing for the vehicle to have a greatly improved ability to negotiate poor road surfaces.

The rotation difference sensitive type coupling may be such one that employs the resistance at a delivery orifice of a hydraulic pump to produce a difference limiting force, or such one that combines a friction clutch with the shearing resistance or the pressure due to shearing resistance, as well as the orifice resistance or the delivery pressure.

The rotation difference sensitive type coupling, which does not use an actuator unlike the torque control type coupling, allows the power transmission apparatus to be the smaller in size and lighter in weight.

If the coupling to be used is an on-off switching type which intermittently transmits torque to a wheel at the output end, it is possible for an on-demand to make selection between a four-wheel driven state and a two-wheel driven state.

The switching type coupling is small in size and light in weight like the rotation difference sensitive coupling, so that the power transmission apparatus can be compact and lightweight.

According to a tenth aspect of the present invention, in a power transmission apparatus according to any one of the first to ninth aspects, the respective output shafts at the front wheel end and the rear wheel end of the power distribution apparatus are linked to power takeout shafts disposed in parallel thereto respectively, and drive power is transmitted via the power takeout shafts to the front wheel end and the rear wheel end. There can be achieved like functions and effects to the first to ninth aspects.

In this configuration, which has power takeout shafts linked to the respective connection shafts at a front wheel end and a rear wheel end of the power distribution apparatus, respective torque takeout parts at the front wheel end and the rear wheel end can be provided in arbitrary axial positions, with a prevention of interferences between the torque takeout parts and the casing and peripheral members, with a facilitated implementation of the power transmission apparatus.

For such reasons, not simply the shape and size of the casing, but also the peripheral members as well as the layout at the vehicle body end can have an enhanced freedom in design, allowing for a flexible coping with various environmental conditions, with possible applications to a wide range of different vehicle types.

According to an eleventh aspect of the present invention, in a power transmission apparatus according to the tenth aspect, an interconnection between a front wheel end output shaft and the power takeout shaft thereof and an interconnection between a rear wheel end output shaft and the power takeout shaft thereof are made at locations radially different with respect to a rotation axis of the power distribution apparatus. There can be achieved like functions and effects to the tenth aspects.

In this configuration, in which the power distribution apparatus has a pair of torque takeout parts disposed at different locations in the radial direction, the torque takeout parts as well as their extensions are free from mutual interferences that otherwise, for example in the case they are disposed in opposition in the radial direction, might have been experienced.

The torque takeout parts may be radially disposed at a predetermined angle relative to each other in accordance with the condition of lubrication of their bearings for support or linking gear parts in the casing.

It therefore is unnecessary to provide the torque takeout parts with extensions or the like for avoiding mutual interference, and it is avoidable to make the power transmission apparatus axially long, thus allowing for the apparatus to be kept compact and high of vehicle mountability.

The torque takeout parts can be provided both on one side or either on both sides of the axial direction of the power distribution mechanism, in addition to that axial extensions provided on the torque takeout parts are free from mutual interference as described, and can have connections to the front and rear wheels at arbitrary locations.

In this manner, the configuration according to the eleventh aspect is greatly effective to avoid intereference with peripheral members.

For such reasons, not simply the shape and size of the casing, but also the peripheral members as well as the layout at the vehicle body end can have an enhanced freedom in design, allowing for a flexible coping with various environmental conditions, with possible applications to a wide range of different vehicle types.

According to a twelfth aspect of the present invention, in a power transmission apparatus according to the tenth or eleventh aspect, the front wheel end output shaft and the rear wheel end output shaft of the power distribution apparatus are disposed axially at both sides of the power distribution apparatus, and linked to the power takeout shafts respectively. There can be achieved like functions and effects to the tenth or eleventh aspects.

In this configuration in which output shafts of the power distribution apparatus are distributed either to both sides of the axial direction, the power distribution apparatus is disposed in an axially central region, with a facilitated axial balancing to reduce vibrations and noises accompanying the rotation, allowing for the durability of bearings to be improved.

In a layout in which the power distribution apparatus is disposed intermediate between the front and rear wheels, such drive power transmission routes up to the differential apparatus (such as propeller shafts) that are provided between the power takeout parts as well as between the front wheels or rear wheels are short, and the torsional vibration is small, thus allowing an improved durability.

According to a thirteenth aspect of the present invention, in a power transmission apparatus according to the twelfth aspect, the front wheel end output shaft of the power distribution apparatus is disposed axially at the front wheel end and the rear wheel end output shaft of the power distribution apparatus is disposed axially at the rear wheel end, to be linked to the power takeout shafts respectively. There can be achieved like functions and effects to the twelfth aspect.

In this configuration in which the output shaft at the front-wheel end is disposed on the front-wheel side of the axial direction of the power distribution apparatus and the output shaft at the rear-wheel end is disposed on the rear-wheel side of the axial direction of the power distribution apparatus, radial dimensions about the power distribution apparatus can be small, and axial dimensions of the power takeout shafts can be reduced.

According to a fourteenth aspect of the present invention, in a power transmission apparatus according to the tenth or eleventh aspect, the front wheel end output shaft and the rear wheel end output shaft of the power distribution apparatus are disposed axially at one end of the power distribution apparatus, to be linked to the power takeout shafts respectively. There can be achieved like functions and effects to the tenth or eleventh aspects.

In this configuration in which the respective output shafts of the power distribution apparatus are disposed both on one side of the axial direction of the power distribution apparatus, their supporting parts can be collected at one point, and interconnections between the output shafts and power takeout parts can be mutually radially provided, with commensurate compactness in the axial direction of the power distribution apparatus.

According to a fifteenth aspect of the present invention, in a power transmission apparatus according to any one of the tenth to fourteenth aspects, the speed changing mechanism of the transmission apparatus comprises a stepless toroidal transmission configured with an input disc linked to the input shaft an output disc linked to a transmission member at an output end, and a friction roller contacting the discs, for rotation of the input disc to be changed in speed by a rocking operation of the friction roller and transmitted to the output disc, and the power distribution apparatus is disposed for a linking in which directions of rotation of the power takeout shafts of the front wheel end output shaft and the rear wheel end output shaft and the sub-shaft are identical. There can be achieved like functions and effects to the tenth to fourteenth aspects.

The stepless toroidal transmission may for example be one of a double cavity type, which has two output discs disposed back-to-back and two input discs disposed at both axial ends thereof, and a single cavity type, in which input and output discs are arranged one by one, although in either case there are needed elements, such as an idler shaft, to make the identical directions of rotation of a sub-shaft and a power takeout shaft for taking out drive power from the output disc.

To this point, the present invention, in which a sub-shaft of an existing sub-shaft type transmission apparatus and a power distribution apparatus are combined to constitute a power transmission apparatus for four-wheel driven vehicle to be compact in size and light in weight is very suitable for combination with such a stepless toroidal transmission as described.

In addition to the compact and lightweight configuration, the combination with a stepless toroidal transmission can enjoy many advantages of the stepless toroidal transmission, such that it is free from interruption of torque during speed change, and capable of smooth running free of speed change shock, and can have a linear response to accelerating operations, and perform a travel under a condition highest of motor efficiency, allowing for greatly improved fuel consumption.

Because the power distribution apparatus can be provided with existing component configuration and arrangement by employing such a linking that the power takeout shafts of front-wheel end output shaft and rear-wheel end output shaft have identical directions of rotation, the power transmission apparatus can be configured compact with an existing layout maintained.

BRIEF DESCRIPTION OF THE DRAWING

The above and other features will be better understood from the exemplary embodiments described below, taken together with the drawings, in which.

DETAILED DESCRIPTION OF THE PREFERRED EMBODIMENTS

Figure 1:
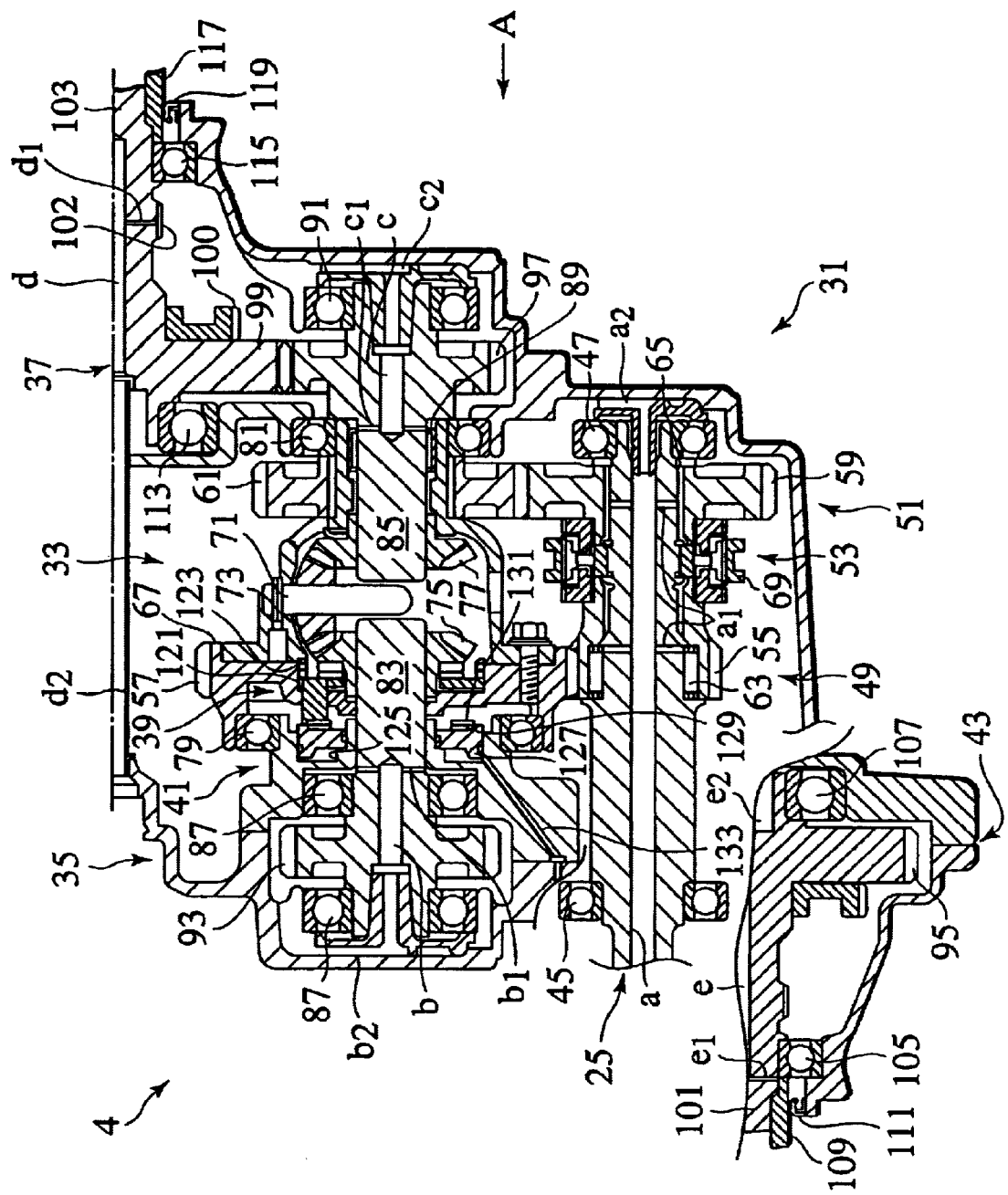
FIG. 1 is a sectional view of a power distribution apparatus constituting part of a first embodiment of the present invention.

Embodiments of the present invention are described in detail below, with reference made to relevant accompanying drawings. Like members are designated by like reference characters.

First Embodiment

A power transmission apparatus 1 according to a first embodiment of the present invention is illustrated in FIG. 1, FIG. 2, FIG. 3, and FIG. 9.

Figure 3:
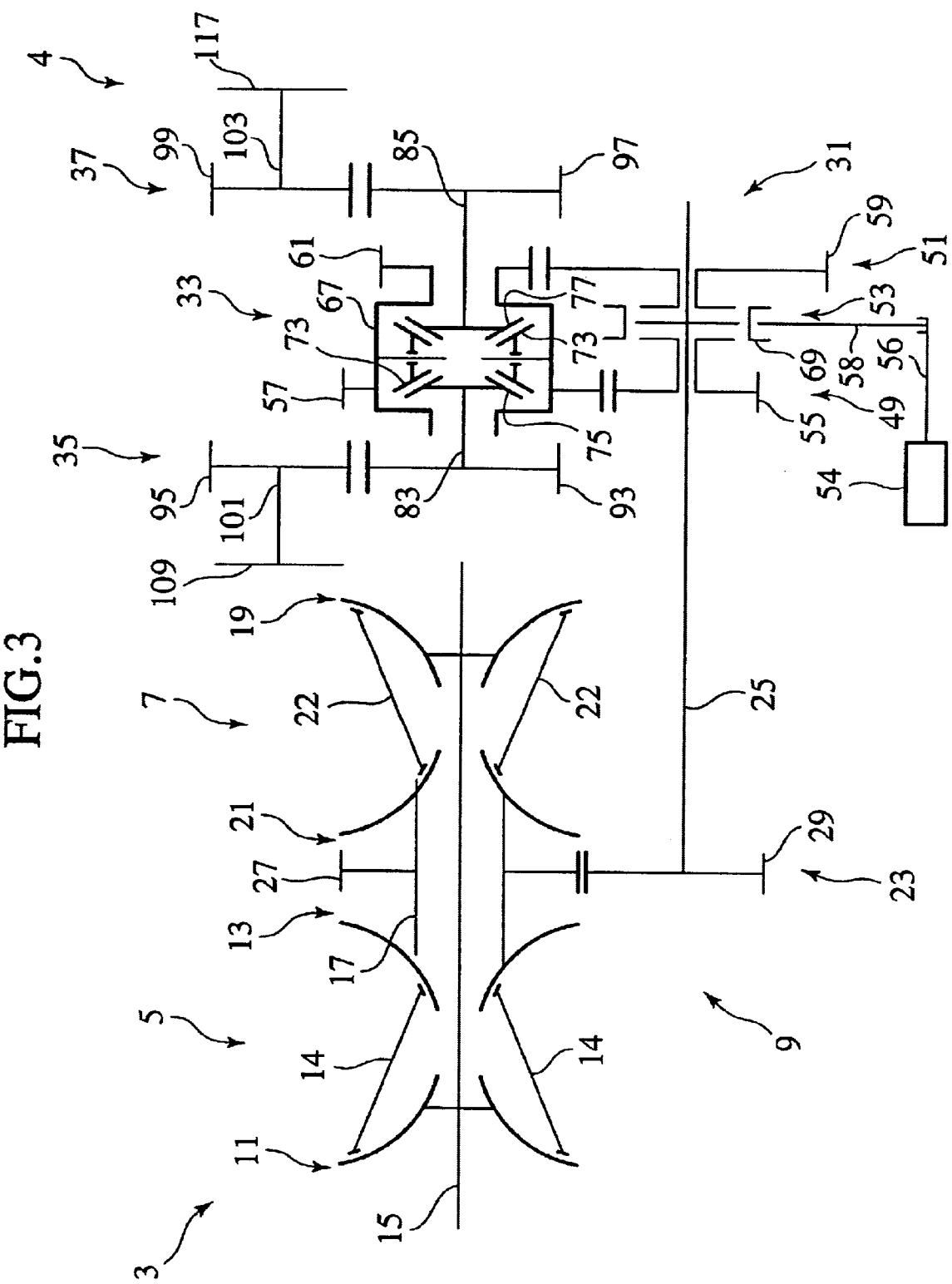
FIG. 3 is a skeleton representation of the first embodiment of the present invention.
Figure 9:
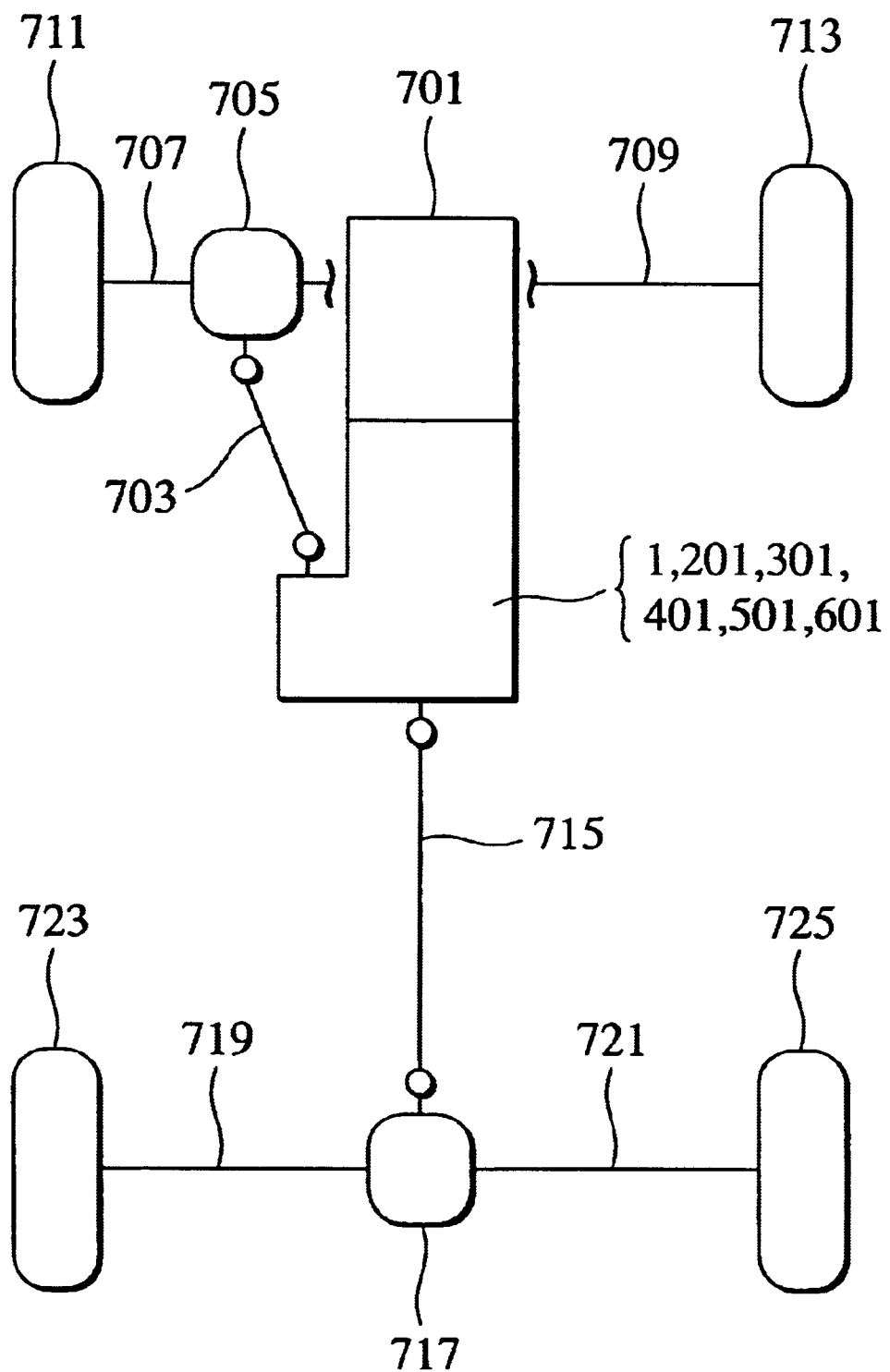
FIG. 9 is a skeleton representation showing the power train in a four-wheel-drive vehicle according to any of the embodiments of the present invention.
Figure 10:
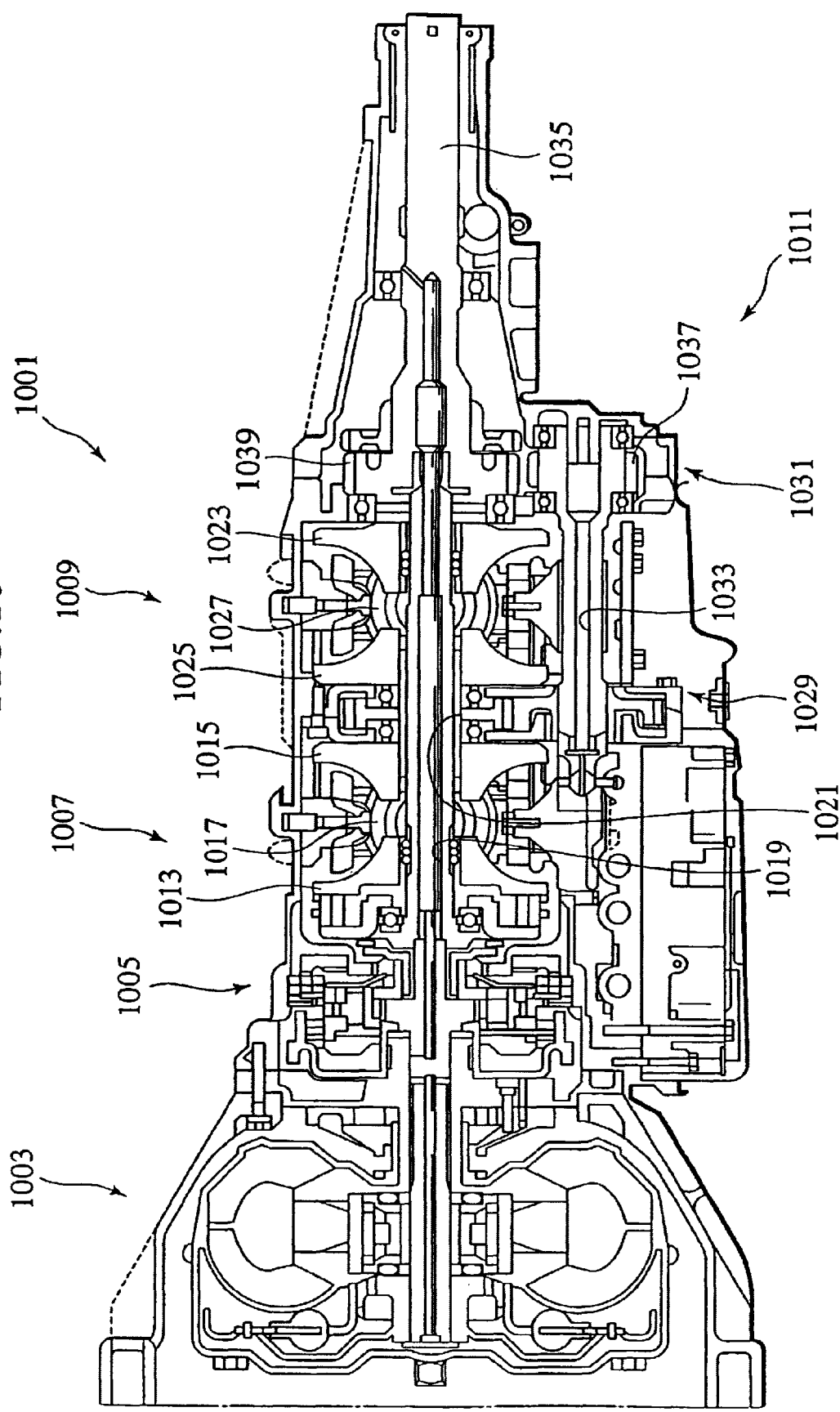
FIG. 10 is a sectional view of related art.

The power transmission apparatus 1 has the features of the first, second, third, fourth, fifth, sixth, seventh, eighth, tenth, eleventh, twelfth, thirteenth, and fifteenth aspects of the present invention. As shown in FIG. 3, the power transmission apparatus 1 has a power distribution apparatus 4 assembled together with a double-cavity stepless toroidal transmission 3 (sub-shaft type transmission apparatus). FIG. 1 shows part of the power distribution device 4 and pan of the stepless toroidal transmission 3, and FIG. 9 shows the power transmission system of a four-wheel-drive vehicle using a power transmission apparatus according to an arbitrary one of various embodiments of the invention.

In FIG. 1 and FIG. 3, the left side is the forward end (motor end) of the vehicle, and elements not assigned reference numerals have not been shown.

The above-noted power train has, as shown in FIG. 97 a longitudinally disposed motor 701 and the power transmission apparatus 1, a front-wheel propeller shaft 703, a front differential 705 (differential apparatus distributing drive power from the motor between the left and right front wheels), front axles 707 and 709, left and right front wheels 711 and 713, a rear-wheel propeller shaft 715, a rear differential 717 (differential apparatus distributing drive power from the motor between the left and right rear wheels), rear axles 719 and 721, and left and right rear wheels 723 and 725.

The drive power of the motor 701 is distributed between the front and rear by the power transmission apparatus 1. The drive power distributed to the front wheels is transmitted from the propeller shaft 703 to the front differential 705, and from the front differential 705 via the front axles 707 and 709 to the left and right front wheels 711 and 713. The drive power at the rear side is transmitted to the rear differential 717 from the propeller shaft 715, and from the rear differential 717 via the rear axles 719 and 721 to the rear wheels 723 and 725.

As shown in FIG. 3, the stepless toroidal transmission 3 has a torque converter, a forward/reverse switching mechanism, stepless speed changing units 5 and 7 (speed changing mechanisms), and an output unit 9 (as a set of output-side transmission members).

The drive power from the motor 701 is transmitted from the torque converter to the forward/reverse switching mechanism.

The forward/reverse switching mechanism is a double-pinion planetary gear mechanism, whereby transmitted drive power is input to a sun gear, and its output is switched between the sun gear and pinion gears, so as to switch the direction of drive power rotation in response to a forward or reverse travel of the vehicle, this drive: power being transmitted to the stepless speed changing units 5 and 7.

The stepless speed changing unit 5 has a disc pair of an input disc 11 and an output disc 13, a friction roller 14, an input shaft 15 and an output shaft 17 (output-side transmission member), and the stepless speed changing unit 7 has a disc pair of an input disc 19 and an output disc 21, and a friction roller 22, and also has, in common with the stepless speed changing unit 5, the input shaft 15 and the output shaft 17.

The input shaft 15 is linked to an output shaft of the forward/reverse switching mechanism, and the output shaft 17 is disposed so as to be freely rotatable about the outer periphery of the input shaft 15.

The input disc 11 and output disc 13, and the input disc 19 and output disc 21 are each disposed so that the profiles of frictional surfaces thereof form a circle and are in mutual opposition. The input discs 11 and 19 are fixed to the input shaft 15 at the outside in the radial directions of the output discs 13 and 21, and the output discs 13 and 21 are fixed to the output shaft 17, and are disposed in mutual back-to-back opposition.

The friction rollers 14 and 22 are pressed against the frictional surfaces of the input disc 11 and output disc 13, and against the frictional surfaces of the input disc 19 and output disc 21, respectively, and drive power transmitted from the forward/reverse switching mechanism to the input shaft 15 is transmitted by the force of friction developed on these frictional surfaces from the input discs 11 and 19, via the friction rollers 14 and 22, to the output discs 13 and 21.

When this occurs, if the rotational axis of each disc is made to be slightly eccentric with respect to the rotational axis of the friction rollers 14 and 22, the disc rotational force causes the point of contact on the friction rollers 14 and 22 to be pushed outward toward the outer periphery. Because the discs are rotating at a high speed and achieve a large outward-directed force, the angle of inclination of the friction rollers 14 and 22 responses with a very high speed.

When the angle of inclination of the friction rollers 14 and 22 changes, the contact radius with the discs changes. For example, as shown in FIG. 3, if an inclination is imparted to the friction rollers 14 and 22 in a direction so that the radius of contact with respect to the input discs 11 and 19 increases, and the radius of contact with respect to the output discs 13 and 21 decreases, then the rotational speed of the output shaft 17 increases, and if an inclination in the reverse direction is imparted, then the rotational speed of the output shaft 17 is reduced.

As noted above, because the input discs 11 and 19 are fixed on the input shaft 15 in mutual opposition, and the output discs 13 and 21 are fixed on the output shaft 17 in mutual opposition, they are pressed by the friction rollers 14 and 22, and the thrust forces generated in the discs are canceled out within the input shaft 15 and the output shaft 17, respectively, so that they have no external influence.

The output unit 9 has a gear set 23, and a sub-shaft 25.

The sub-shaft 25 is disposed in parallel with the input shaft 15 and the output shaft 17.

The gear set 23 has a gear 27 fixed to the output shaft 17, and a gear 29 fixed to the sub-shaft 25, and links the output shaft 17 and the sub-shaft 25.

The drive power taken out of the stepless speed changing units 5 and 7 is transmitted via the gear set 23 to the sub-shaft 25, which is thereby rotated.

As shown in FIG. 1, the power distribution apparatus 4 has an interconnecting Hi(high)-Lo(low) shift mechanism 31 (speed changing mechanism), a bevel gear type center differential 33 (differential mechanism), output gear sets 35 and 37, a positive clutch 39 (difference limiting mechanism-:clutch mechanism), and a hydraulic actuator 41.

The sub-shaft 25 of the stepless toroidal transmission 3 enters a casing 43, from the front side, and is supported in the casing 43, at a central part thereof by a ball bearing 45 and at a rear end thereof by a ball bearing 47.

The Hi-Lo shift mechanism 31 has a pair of gear sets 49 and 51 different in gear ratio from each other, a synchronizing mechanism 53, and an actuator 54.

The gear set 49 is constituted with mutually engaging gears 55 and 57, and the gear set 51 is constituted with mutually engaging gears 59 and 61.

The gears 55 and 59 are coaxially arranged on the sub-shaft 25, and supported by needle bearings 63 and 65 on the sub-shaft 25, respectively. The gear 57 is formed on a differential case 67 (input end member) of the center differential 33, and the gear 61 is splined onto the differential case 67.

The synchronizing mechanism 53 is arranged on the sub-shaft 25, for linking the sub-shaft 25 to one of the gear sets 49 and 51 by an operation for movement of a coupling sleeve 69 to be caused by an electric stepping motor as an actuator 54, via a shift rod 56 and a shift fork 58.

Figure 2:
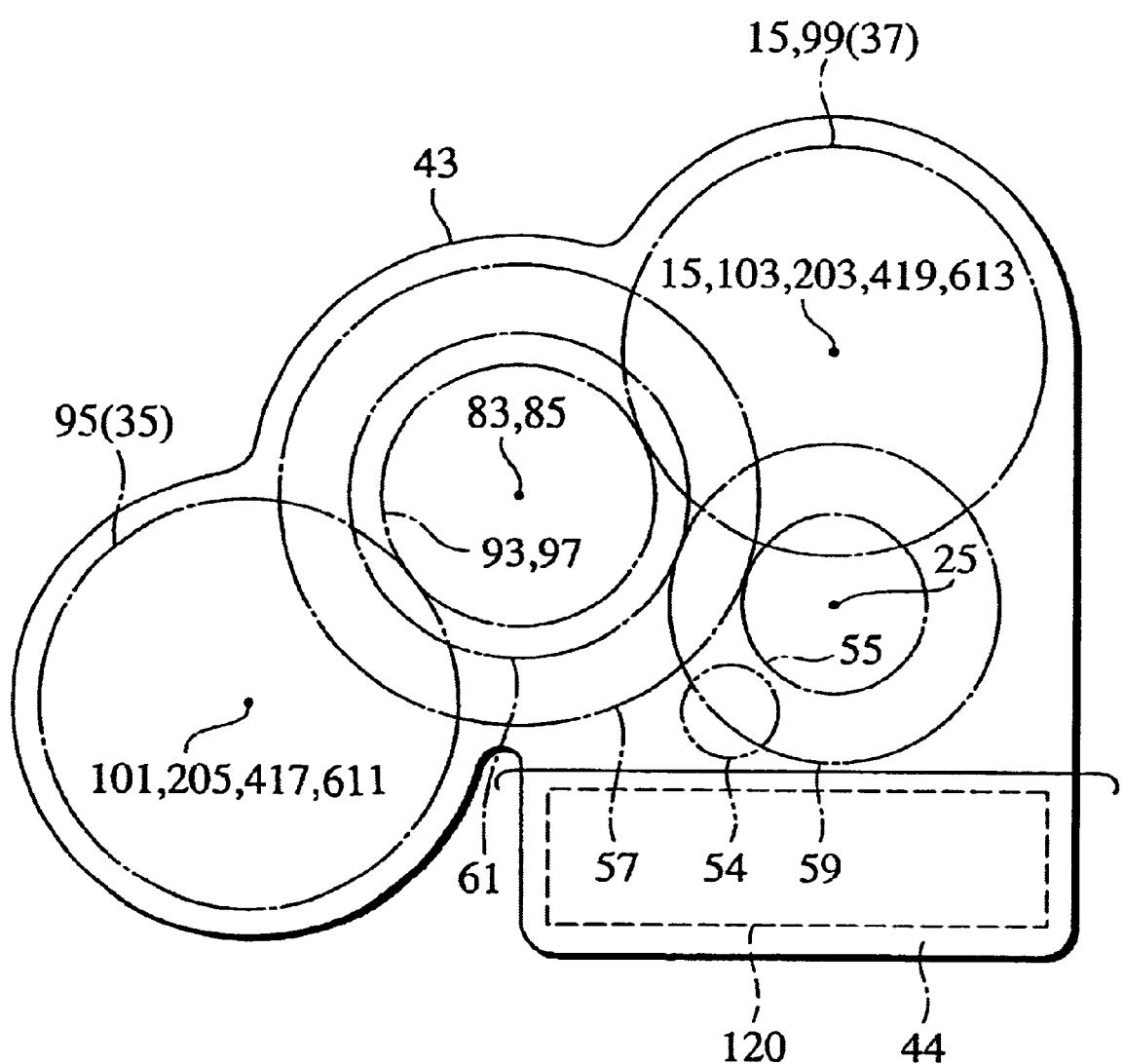
FIG. 2 is a view of FIG. 1 from the direction of arrow A.

It is noted that the actuator 54 is arranged, as shown in FIG. 2, downwardly obliquely off from the sub-shaft 25, in the direction of rotation axis.

If the gear set 49 (Lo position) is selected, the rotation of sub-shaft 25 (drive power of the motor 701) is decreased in speed, when transmitted to the differential case 67 (center differential 33). If the gear set 51 (Hi position) is selected, the rotation of sub-shaft 25 is substantially equal in speed, when transmitted to the differential case 67.

The center differential 33 has the differential case 67, at least one set of a pinion shaft 71 and a pinion gear 73, and a set of front and rear side gears 75 and 77.

The differential case 67 is supported by ball bearings 79 and 81 on the casing 43. The pinion shaft 71 is fixed to the differential case 67, and the pinion gear 73 is supported on the pinion shaft 71. The side gears 75 and 77 respectively engage with the pinion gear 73, while one side gear 75 is splined onto a front wheel drive shaft 83 (output shaft), and the other side gear 77 is splined onto a rear wheel drive shaft 85 (output shaft).

The drive shaft 83 is supported by a ball bearing 87 on the casing 43. The drive shaft 85 is supported by a needle bearing 89 on the differential case 67 and by a ball bearing 91 on the casing 43.

The drive power from the motor 701 rotating the differential case 67 is transmitted from the pinion shaft 71 to the pinion gear 73, and distributed between the side gears 75 and 77 to rotate the respective drive shafts 83 and 85.

The output gear set 35 is constituted with mutually meshing gears 93 and 95. The output gear set 37 is constituted with mutually meshing gears 97 and 99.

The gear 93 is formed on the drive shaft 83, and the gear 95 (output shaft) is formed on a connection shaft 101 (power takeout shaft) at the front wheel end. The gear 97 is formed on the drive shaft 85, and the gear 99 (output shaft) is formed on a connection shaft 103 (power takeout shaft) at the rear wheel end. As shown in FIG. 1 and FIG. 3, the connection shafts 101 and 103 are disposed in opposition in the axial direction, and arranged coaxial with respect to the stepless toroidal transmission 3.

The connection shaft 101 is projected forward from the casing 43, and supported by ball bearings 105 and 107 on the casing 43. A flange 109 (torque takeout part) is splined on the connection shaft 101, and a seal 111 for preventing oil leakage and invasion of foreign matter is disposed between the flange 109 and the casing 43.

The flange 109 is linked via the front wheel propeller shaft 703 to the front differential 705.

The connection shaft 103 is projected rearward from the casing 43, and supported by ball bearings 113 and 115 on the casing 43. A flange 117 (torque takeout part) is splined On the connection shaft 103, and a seal 119 for preventing oil leakage and invasion of foreign matter is disposed between the flange 117 and the casing 43.

The flange 117 is linked via the rear wheel propeller shaft 715 to the rear differential 717.

As shown in FIG. 2, the output gear sets 35 and 37 are arranged in opposition to each other with respect to the radial direction, so that the interconnection between gear 95 and the connection shaft 101 is radially in opposition to the interconnection between the gear 99 and the connection shaft 103. It is noted that in FIG. 3 they are depicted in the same radial position.

As described, the drive power of the motor 701 distributed via the center differential 33 to the drive shaft 109 is transmitted via the output gear set 35, connection shaft 101, flange 109, and propeller shaft to the front differential, where it is distributed between the left and right front wheels. The drive power distributed to the drive shaft 85 is transmitted via the output gear set 37, connection shaft 103, flange 117, and propeller shaft to the rear differential, where it is distributed between the left and right rear wheels.

The drive power of the motor is reversed in rotation between the input discs 11 and 19, friction rollers 14 and 22, and output discs 13 and 21 of the stepless toroidal transmission 3, at the output unit 9, and between the Hi-Lo shift mechanism 31 and the center differntial 33, and further at the output gear sets 35 and 37 to rotate the connection shafts 101 and 103 in the forward directions, respectively.

In this manner, those intermediate rotation members serve as idlers to rotate the connection shafts 101 and 103 in the forward directions.

It is noted that by imparting different tooth numbers to the side gear 75 for front wheels and the side gear 77 for rear wheels or a different gear ratio to the output gear sets 35 and 37, the distribution ratio of drive power to be transmitted to the front wheels and the rear wheels can be changed.

Further, if a difference in resistance to drive is developed between the front and rear wheels, such as on a poor road surface, then the pinion gear 73 of the center differential 33 revolves, differentially distributing drive power to the front and rear wheels.

The positive clutch 39 is provided between the side gear 75 for front wheels and a clutch member 121. The clutch member 121 is linked in a movable manner Lo the differential case 67, with a return spring 123 disposed between the clutch member 121 and the differential case 67 for biasing the clutch member 121 toward a disengagement side of the positive clutch 39.

The hydraulic actuator 41 is constituted with a cylinder 125 formed in the casing 43 and a piston 127. The piston 127 at the stationary side and the clutch member 121 at the rotation side has a combination of a thrust bearing 129 and a washer 131 interposed for absorbing a relative rotation therebetween.

The cylinder 125 is connected to a hydraulic pump, via a hydraulic path 133 provided through the casing 43.

Hydraulic oil is sent from the hydraulic pump to the cylinder 125, exerting a pressure via the piston 127, thrust bearing 129, and washer 131 on the clutch member 121, causing the positive clutch 39 to be engaged, thereby locking a differential rotation at the center differential 33.

If the oil supply to the cylinder 125 stops, the return spring 123 urges the clutch member 121 into movement to disengage the positive clutch 39, cancelling the difference locking.

As the differntial rotation at the center differential 33 is locked, even under a condition with a tendency for the wheels to skid such as on a poor road surface or a low-$\mu$ road surface, the front and rear wheels arc prevented from skidding, thereby improving the ability of the vehicle to negotiate poor road surfaces, starting performance, acceleration performance, body stability, and direction stability.

When the difference locking is canceled, the front and rear wheels are allowed to be free to make a differential rotation, so that it is possible to improve such characteristics of the vehicle as head direction changeability and turnability, as well as fuel consumption of the motor 701.

It is noted that the sub-shaft 25, gear 93, gear 97, connection shaft 103, and connection shaft 101 have axial oil paths a, b, c, d, and e provided along their axes, the oil path a communicating with radial oil paths a1 and a2, the oil path b communicating with radial oil paths b1 and b2, the oil path c communicating with radial oil paths c1 and c2, the oil path d communicating with a radial oil path d1, and the oil path e communicating with radial oil paths e1 and e2.

The oil paths a2, b2, c2, and e2 are provided at end parts of the sub-shaft 25, gear 93, gear 97, and connection shaft 101, respectively.

As shown in FIG. 2, an oil pan 44 is provided under the power transmission apparatus 1. The oil pan 44 accommodates therein a control valve body 120 for performing hydraulic control to an actuator that operates the friction rollers 14 and 22 to rock, and lubrication such as to the stepless transmission 3 and the Hi-Lo shift mechanism 31 is performed via oil paths, such as in the input shaft 15 and the casing 437 communicating with the control valve body 120.

Rotational members dipped at their lower parts in a pool of oil at the bottom of the casing 43 scoop up oil around the gear 59. Scooped oil is supplied via the oil paths a2, b2, c2, and e2 to the oil paths a, b, c, and e, and scattered by centrifugal forces out of and around the oil paths a1, b1, c1, and e1, to the respective gear's meshing parts, support parts, sliding parts, and the like, for their lubrication to be sufficient for the cooling, thereby improving endurability.

The input shaft 15 of the stepless toroidal transmission 3 has an oil pump installed thereon, to be driven for rotation by the input shaft 15, and discharged oil therefrom is sent via an oil pipe d2 (FIG. 1) to the oil path d, where it is blasted from the oil path d1, effecting a forced lubrication to peripheries thereof to be cooled.

The connection shaft 103 is formed with a pulse gear 102 for a speedometer, and has a parking lock gear 100 fixed on the periphery of the connection in shaft 3, neighboring the gear 99.

The power transmission apparatus 1 for four-wheel driven vehicle is thus constituted.

The power transmission apparatus 1, in which the power distribution apparatus 4 is disposed with an axial overlap on the sub-shaft 25, is reduced by dimension of the overlap in the axial direction, to be compact, without increase in weight, with an improved vehicle mountability.

No need for the sub-shaft 25 to have a changed axial dimension prevents a associated increase in cost.

The interconnection between the sub-shaft 25 and the center differential 33 (differential case 67) does not involve such conventional members as the gear set 1031 and output shaft 1035 of the stepless toroidal 1001, not idle gear.

Therefore, the gear set 1031, output shaft 1035, idle gear, and torque control gear are eliminated from the existing sub-shaft type transmission apparatus, having a reduced number of components, allowing for compact size, light weight, and low cost.

Changes or modifications more than removing those intermediate members, for example, such a change or modification as a change in size of the sub-shaft 25 or a modification of the casing, are not necessitated nor possibly suppressed, so that a power transmission apparatus 1 for four-wheel driven vehicle can be achieved with an extreme low cost, with an existing layout maintained.

The power transmission apparatus 1 made compact in size and light in weight has a reduced possibility of interference with the casing of which the modification is unnecessary or possibly suppressed as described, thus resulting in the more reduced cost in practice.

The casing can be made compact in size in accordance with the compactness and lightweight of the power transmission apparatus 1, with a thin and lightweight wall with an improved rigidity.

The Hi-Lo shift mechanism 31 is formed simply by those members (gears) disposed coaxial respectively with the input side member (differential case 67) or the sub-shaft 25, without using members on other shafts, for example, idle gears, and has a low-cost arrangement with a reduced number of components, avoiding increase in weight or enlargement in radial direction.

In this manner, an existing space is available for installation of the Hi-Lo shift mechanism 31, without needing provision of a new installation space, without the need of changing a conventional layout, thus allowing for implementation at low cost.

The Hi-Lo shift mechanism 31 and operation means therefor are disposed coaxial with the sub-shaft 25, allowing for the center differential 33 to be arranged coaxial with the stepless toroidal transmission 3, while achieving a differential function with a conventional layout maintained.

The power distribution apparatus 4 is provided with the center differential 33, allowing for implementation of a full-time four-wheel driven vehicle in which drive power is always transmitted to front and rear wheels.

By imparting different tooth numbers to the side gears 75 and 77 of the center differential 33 or a different gear ratio to the output gear sets 35 and 37, the power distribution ratio between front and rear wheels can be changed, allowing for great improvements in power-related performances of the vehicle, as well as for applications to a wide range of vehicle types different of a power distribution ratio to be set.

The positive clutch 39 is arranged coaxial with the center differential 33, with a facilitated connection of the center differential 33, allowing for the more compact arrangement.

As described, the positive clutch 39 is adapted for a difference locking function, whereby even over a poor road surface or a low-$\mu$ road surface the front and rear wheels are prevented from skidding, thereby improving the ability of the vehicle to negotiate poor road surfaces, starting performance, acceleration performance, body stability, and direction stability, and further for cancellation of the difference locking, thereby allowing improvements of such vehicular characteristics as head direction changeability and turnability, as well as fuel consumption of the motor 701.

The positive clutch 39 is disposed in the axial direction of the center differential 33, SO that, in accordance with a splitting structure or split location of the casing and the spacing between the casing and the positive clutch 39, as well as with whether interferences are present or not between the power transmission apparatus 1 and peripheral members at the vehicle body end, the positive clutch 39 is allowed to have the location for disposition selected for the assembly, with a facilitated implementation.

In the arrangement described, in which the location for disposition of the positive clutch 39 is selective in accordance with peripheral members and their layout, the hydraulic actuator 41 as an operation means can be disposed outside the center differential 33, so that the arrangement of hydraulic lines are prevented from interfering with the center differential 33, with a facilitated line installation, with advantages in layout.

The power distribution apparatus 4 has the connection shafts 101 and 103 linked respectively to the respective gears 95 and 99 at the front wheel side and the rear wheel side thereof, thereby enabling the flanges 109 and 117 as respective torque takeout parts at the front wheel side and the rear wheel side to be provided in arbitrary axial positions, with a prevention of interferences between the torque takeout parts and the casing and peripheral members, with a facilitated implementation of the power transmission apparatus 1.

The respective torque takeout parts (output gear sets 35 and 37) are disposed in opposition in the radial direction, whereby the torque takeout parts as well as their axial extensions are kept from mutual interferences, and in particular, the front wheel end output gear set 35 is disposed on a front wheel side in the axial direction of the power distribution apparatus and the rear wheel end output gear set 37 is disposed on a rear wheel side in the axial direction of the power distribution apparatus 4, thereby allowing for radial dimensions about the power distribution apparatus 4 to be reduced in diameter, as well as for the axial dimensions of the connection shafts 101 and 103 to be reduced.

Therefore, without the need for provision such as of extentions of the torque takeout parts to avoid interferences therebetween, the power transmission apparatus 1 is prevented from being axially elongated, and kept compact.

For such reasons, not simply the shape and size of the casing, but also the peripheral members as well as the layout at the vehicle body end can have an enhanced freedom in design, allowing for a flexible coping with various environmental conditions, with possible applications to a wide range of different vehicle types.

The power distribution apparatus 4 has its front wheel end and rear weel end output shafts constituted with the drive shafts 83 and 85, output gear sets 35 and 37, connection shafts 101 and 103, and flanges 109 and 117 respectively separated in mutual opposition at both sides of the axial direction, so that the power distribution apparatus 4 can be arranged in an axially central portion, with a facilitated balancing in the axial direction, with reduced vibrations and noises associated with the rotation, allowing for the bearings 79 and 81 to be improved in durability.

The power distribution apparatus 4, which is disposed at an intermediate between the front and rear wheels, is allowed to have the connection shafts 101 and 103 shortened, with reduced torsional vibrations, with an improved endurability.

The stepless toroidal transmission 3 is a double cavity system having the two output discs 13 and 21 disposed back-to-back, which needs the sub-shaft 25 for taking out drive power from the output discs 13 and 21.

According to the embodiment, there is implemented a power transmission apparatus for four-wheel driven vehicle to be small in size, light In weight, and low of cost, by incorporating a power distribution apparatus to a sub-shaft of an existing sub-shaft type transmission apparatus, which is very suitable also for the combination with the stepless toroidal transmission 3.

By use of the stepless toroidal transmission 3, the embodiment, which is constituted compact in size and light in weight, can enjoy many advantages of the stepless toroidal transmission, such that no interruption of torque occurs in speed change, allowing for a smooth running free of shocks due to the speed change, for a linear speed-change response to operation for acceleration, and for a travel under a condition of highest efficiency of a motor 701, with a great improvement in fuel consumption.

The power distribution apparatus 4 is arranged in place of a conventional idler (gear 1039), thereby allowing for the power transmission apparatus 1 to be constituted with the more reduced cost, with an existing component arrangement maintained.

Second Embodiment

A power transmission apparatus 201 according to a second embodiment of the present invention is described below, with references made to FIG. 4 and FIG. 9.

This power transmission apparatus 201 has the features of the first, second, third, fourth, fifth, sixth, seventh, eighth, tenth, eleventh, twelfth, and fifteenth aspects of the present invention. FIG. 4 is a drawing showing a power distribution apparatus 202 assembled together with a stepless toroidal transmission 3 to constitute the power transmission apparatus 201, the left side of which is the forward end (motor 701 end) of the vehicle, and elements not assigned reference numerals have not been shown.

The power transmission apparatus 201 is a variation of the power transmission apparatus 1 in FIG. 1 to FIG. 3, in which the configuration of the power takeout parts has been changed. The differences between the two embodiments are described below.

Figure 4:
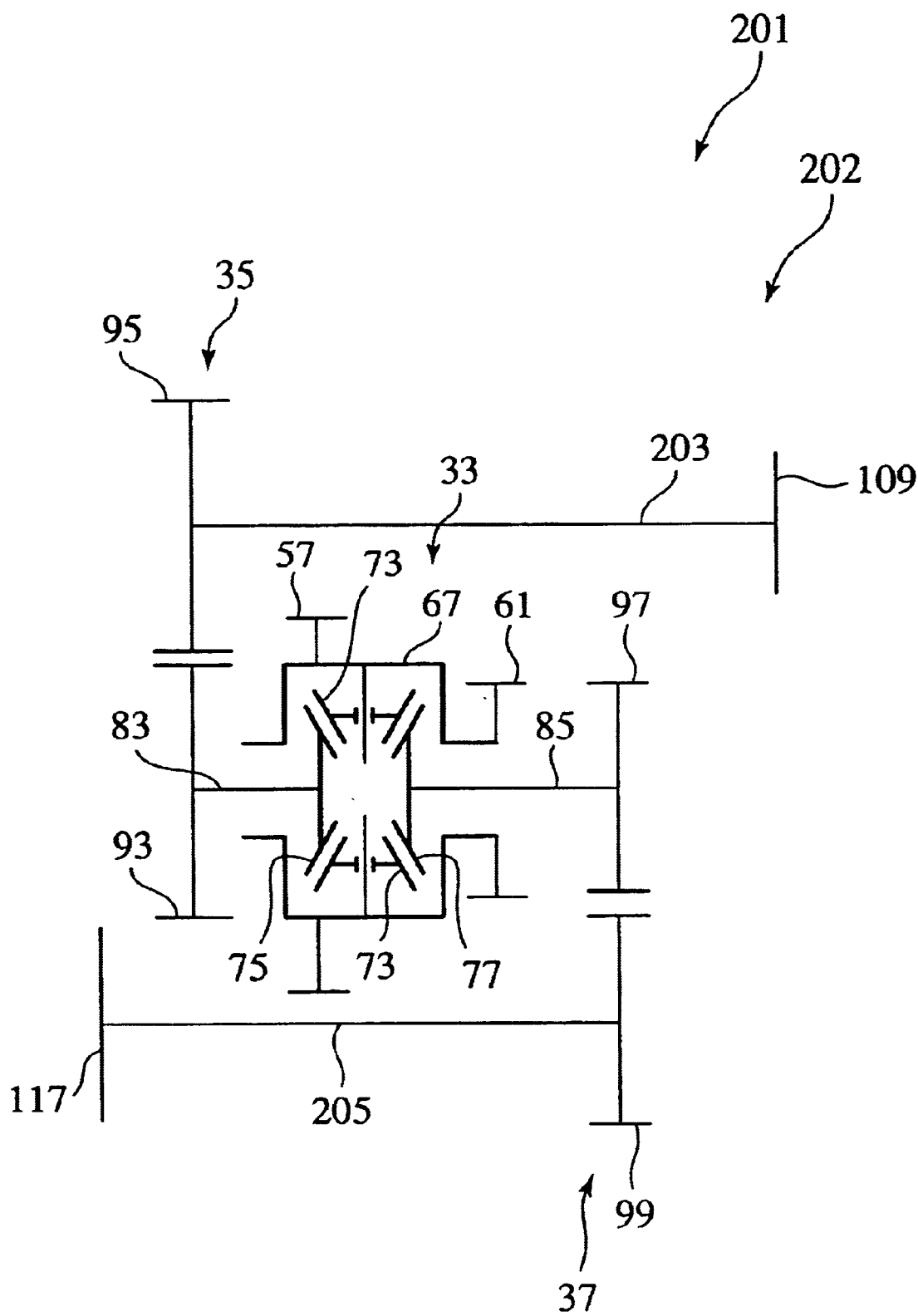
FIG. 4 is a skeleton representation of a power distribution apparatus constituting part of a second embodiment of the present invention.

As shown in FIG. 4, a gear 95 of an output gear set 35 is formed on a connection shaft 203 (drive power takeout shaft), which shaft 203 is disposed rearward of the gear 95. Further, a flange 109 linked to the connection shaft 203 is linked via a rear wheel propeller shaft 715 to a rear differential 717.

Further, a gear 99 of an output gear set 37 is formed on a connection shaft 205 (drive power takeout shaft), which shaft 205 is disposed forward of the gear 99. Further, a flange 117 linked to the connection shaft 205 is linked via a front wheel propeller shaft 703 to a front differential 705.

In this manner, the connection shafts 203 and 205 are disposed in opposition in the axial direction.

The power transmission apparatus 201 is thus configured.

In the power transmission apparatus 201, like the power transmission apparatus 1, the output gear sets 35 and 37 are disposed in opposition in the radial direction (FIG. 2), whereby their axial extensions are kept from mutual interference, thus allowing for the connection shafts 203 and 205 as drive power takeout parts to be separated on both sides of the axial direction as described. Contrary to the power transmission apparatus 1, the output gear set 35 is linked to the rear wheel end, and the output gear set 37 is linked to the front wheel end.

In this manner, by provision of the connection shafts 203 and 205, torque takeout parts can be set in arbitrary positions, allowing for a flexible coping with various environmental conditions, such as peripheral members and vehicle body side layout, with possible applications to a wide range of different vehicle types.

In the power transmission apparatus 201, the gear set 35 disposed in front of a center differential 33 is linked to the rear wheel end, and the gear set 37 disposed at the back is linked to the front wheel end, with associated effects in addition to like effects to the power transmission apparatus 1.

Third Embodiment

Figure 5:
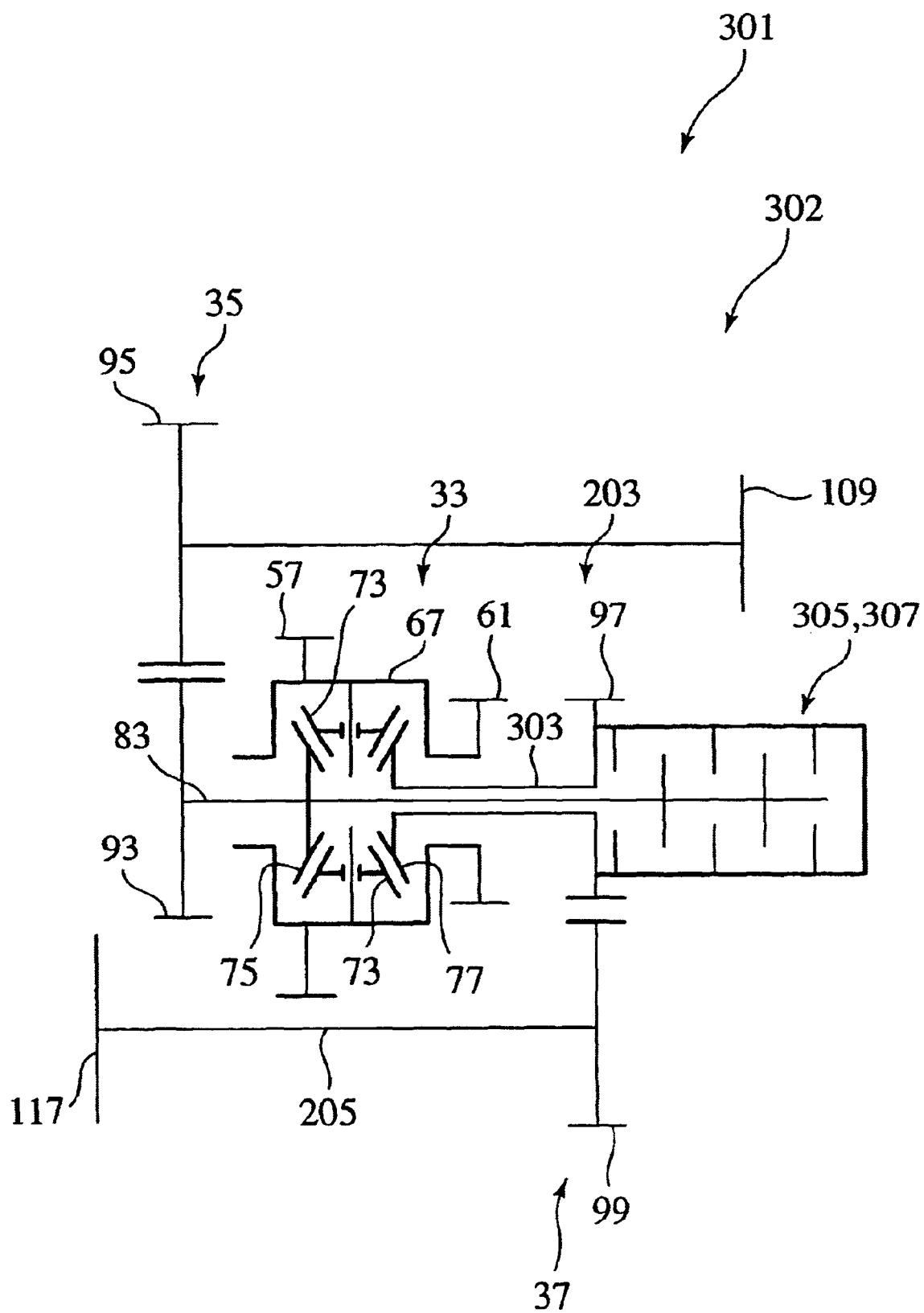
FIG. 5 is a skeleton representation of a power distribution apparatus constituting part of a third embodiment of the present invention.

A power transmission apparatus 301 according to a third embodiment of the present invention is described below, with references made to FIG. 5 and FIG. 9.

This power transmission apparatus 301 has the features of the first, second, third, fourth, fifth, sixth, eighth, tenth, eleventh, twelfth, and fifteenth aspects of the present invention. FIG. 5 is a drawing showing a power distribution apparatus 302 assembled together with a stepless toroidal transmission 3 to constitute the power transmission apparatus 301, the left side of which is the forward end (motor 701 end) of the vehicle, and elements nor assigned reference numerals have not been shown.

The power transmission apparatus 301 is a variation of the power transmission apparatus 201 of FIG. 4, in which the configuration of the difference limiting mechanism has been changed The differences between the two embodiments are described below.

A side gear 77 of a center differential 33 is linked to a hollow drive shaft 3037 and a drive shaft 83 of a side gear 75 extends through the drive shaft 303.

Outside the center differential 33, at the rear ends of the drive shafts 83 and 303, there is mounted a difference limiting mechanism 305 in a unit or a rotation difference sensitive clutch 307 in a unit.

The difference limiting mechanism 305 has a multiple disk clutch and an actuator for opening and closing the clutch.

The actuator may be a fluid pressure actuator such as a hydraulic actuator, electromagnet Or electric motor.

Activating the difference limiting mechanism 305 by the actuator prevents the wheels from skidding even on a poor road surface or low-$\mu$ road surface, thereby improving performances in bad road running, starting, acceleration, vehicle body stability, and straight running ability.

Stopping the activation of the difference limiting mechanism 305 improves head rotation and turning of the vehicle, improving fuel consumption of the motor 701.

Adjustment of the difference limiting force of the difference limiting mechanism 305 by the actuator in accordance with changes in road conditions, steering conditions, or acceleration conditions allows the selection of optimum conditions among the improved effects in performances in bad road running, starting, acceleration, straight running ability, and the stability of the vehicle, which are obtained when the difference is limited, and the improved effects in performances in head rotation, turning and fuel consumption, which are obtained when the difference is allowed.

The rotation difference sensitive clutch 307 is a difference limiting mechanism providing speed-sensitive difference limiting function by which as differential rotation is increased, difference limiting force is increased by shearing resistance of viscous fluid.

The rotation difference sensitive clutch 307 transmits larger drive force as the idle rotation speed of the idling wheels increases to the gripped wheels even on a poor road surface or low-$\mu$ road surface, unlike a torque sensitive difference limiting mechanism, to prevent the vehicle from being stuck on bad roads, thereby improving performances in running and escaping.

The power transmission apparatus 301 is thus constituted.

In the power transmission apparatus 1 and 201 described above, the positive clutch 39 serving as a difference limiting mechanism is incorporated in the center differential (the differential case 67), and the hydraulic actuator 41 as a controlling means is not united with the positive clutch 39. On the other hand, in the power transmission apparatus 301 with the difference limiting mechanism 305 disposed outside the center differential 33, pressure line to the fluid pressure actuator or lead wires to the electromagnet and the electrical motor do not interfere with the center differential 33, so that piping and wiring thereof are significantly facilitated, being advantageous in layout.

The difference limiting mechanisms 305 or 307 mounted outside the center differential 33 can be united and individually removed, so that attaching, detaching and maintenance thereof are facilitated.

In the power transmission apparatus 301, large differential rotation is applied to the difference limiting mechanisms 305 or 307 disposed between the side gears 75 and 77 and differential torque is resultingly reduced, so that the difference limiting mechanisms 305 or 307 made smaller in size can give sufficient difference limiting function, resulting in the lightweight and compact power transmission apparatus 301 and improved mountability thereof.

The power transmission apparatus 301 has the same effects as those of the power transmission apparatus 201 in addition to the effects of mounting the united difference limiting mechanisms 305 or 307 outside the center differential 33 and the effects brought by the fact that the difference limiting mechanisms 305 or 307 are not made of the positive clutch 39 for locking differential.

Fourth Embodiment

A power transmission apparatus 401 according to a fourth embodiment of the present invention is described below, with references made to FIG. 6 and FIG. 9.

The fourth embodiment has the features of the first, second, third, fourth, fifth, sixth, eighth, tenth, eleventh, fourteenth and fifteenth aspects of the present invention. FIG. 6 shows a power distribution apparatus 402 constituting the power transmission apparatus 401 with the stepless toroidal transmission 3, and in this drawing the left side is the forward end (motor 701 end) of the vehicle, and elements not assigned reference numerals have not been shown.

The power transmission apparatus 401 is a variation of the power transmission apparatus 1 in FIG. 1, wherein the directional position of an output shaft (torque takeout part) is changed. The difference is described below A side gear 77 of a center differential 33 is connected to a hollow drive shaft 403. A drive shaft 83 of a side gear 75 extends throught the drive shaft 403 to take out driving force from the rear like the side gear 77.

Thus the drive shafts 83 and 403 of the center differential 33 are disposed on one end (rearward) in the axial direction.

An output gear set 405 is constituted with mutually engaging gears 407 and 409. An output gear set 411 is constituted with mutually engaging gears 413 and 415.

The output gear sets 405 and 411 are disposed radially opposed to each other.

The gear 407 is provided at the rear end of the drive shaft 403. The gear 413 is provided at the rear end of the drive shaft 83. The gear 409 is provided on a connection shaft 417 (power take-out shaft). The gear 415 is provided on a connection shaft 419 (power take-out shaft).

A flange 117 is connected to the connection shaft 417. A flange 109 is connected to the connection shaft 419.

The flange 109 is connected to a rear differential 717 via a propeller shaft 715 for the rear wheels. The flange 117 is connected to a front differential 705 via a propeller shaft 703 for the front wheels.

Thus the power transmission apparatus 401 has the output gear sets 405 and 411 disposed on the one end (rearward) in the axis direction of the center differential 33, thereby taking out driving force for both the front and rear wheels from the rearward of the center differential.

The power transmission apparatus 401 is thus constituted.

Since the power transmission apparatus 401 has the drive shafts 83 and 403 serving as output shafts of a power distribution apparatus 4 and the output gear sets 405 and 411 disposed on one end in the axial direction, these supporting parts can be arranged closely, which provides compactness in the axial direction.

Since the output gear sets 405 and 411 are disposed rearward of the center differential 33 (on the one end in the axis direction), the resulting front open space allows the center differential 33 to be disposed closer to the stepless toroidal transmission 3.

The arrangement of the output gear sets 405 and 411 in a radially opposing manner prevents the connection shaft 417 and the flange 117 and the connection shaft 419 and the flange 109 which are axial extensions of the gear sets 405 and 411 from interfering with one another. This makes it possible to arrange the connection shaft 417 rearward to be connected to the rear wheels and to arrange the connection shaft 419 forward to be connected to the front wheels, for example.

Thus the power transmission apparatus 401 can flexibly adapt to various environmental conditions such as in layout of surrounding members or vehicle bodies, being applicable to different types of vehicles.

Figure 7:
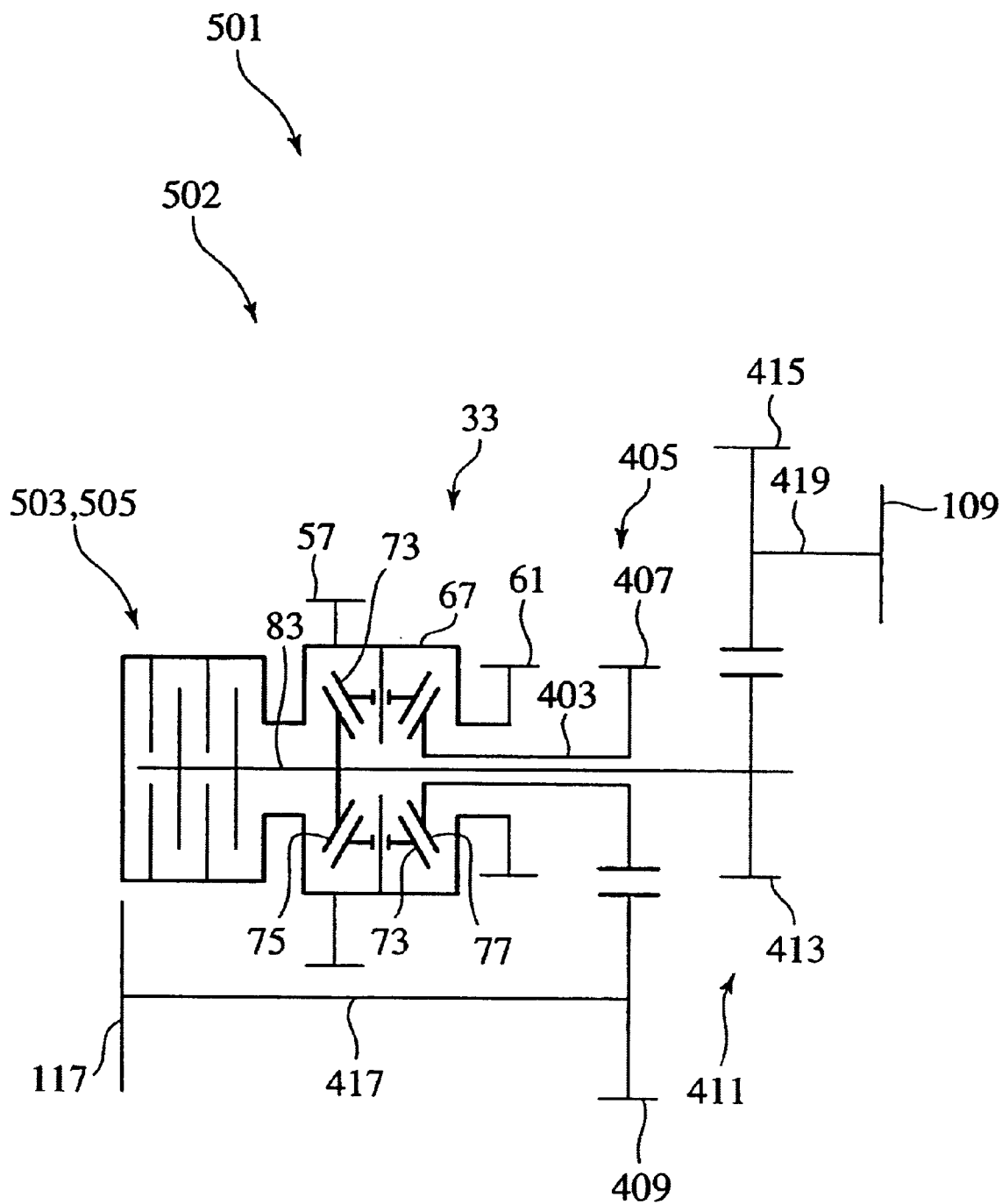
FIG. 7 is a skeleton representation of a power distribution apparatus constituting part of a fifth embodiment of the present invention.

The power transmission apparatus 401 has the same effects as those of the power transmission apparatus 1 in addition to the effects of disposing both the drive shafts 83 and 403 and the output gear sets 405 and 411 on the one end of the center differential 33 in the axis direction Fifth Embodiment A power transmission apparatus 501 according to a fifth embodiment of the present invention is illustrated in FIGS. 7 and 9

The power transmission apparatus 501 has the features of the first, second, third, fourth, fifth, sixth, eighth, tenth, eleventh, fourteenth and fifteenth aspects of the present invention. As shown in FIG. 7, the power transmission apparatus 501 has a power distribution apparatus 502 assembled together with a stepless toroidal transmission 3. In FIG. 7, the left side is the forward end (motor 701 end) of the vehicle, and elements not assigned reference numerals have not been shown.

Figure 6:
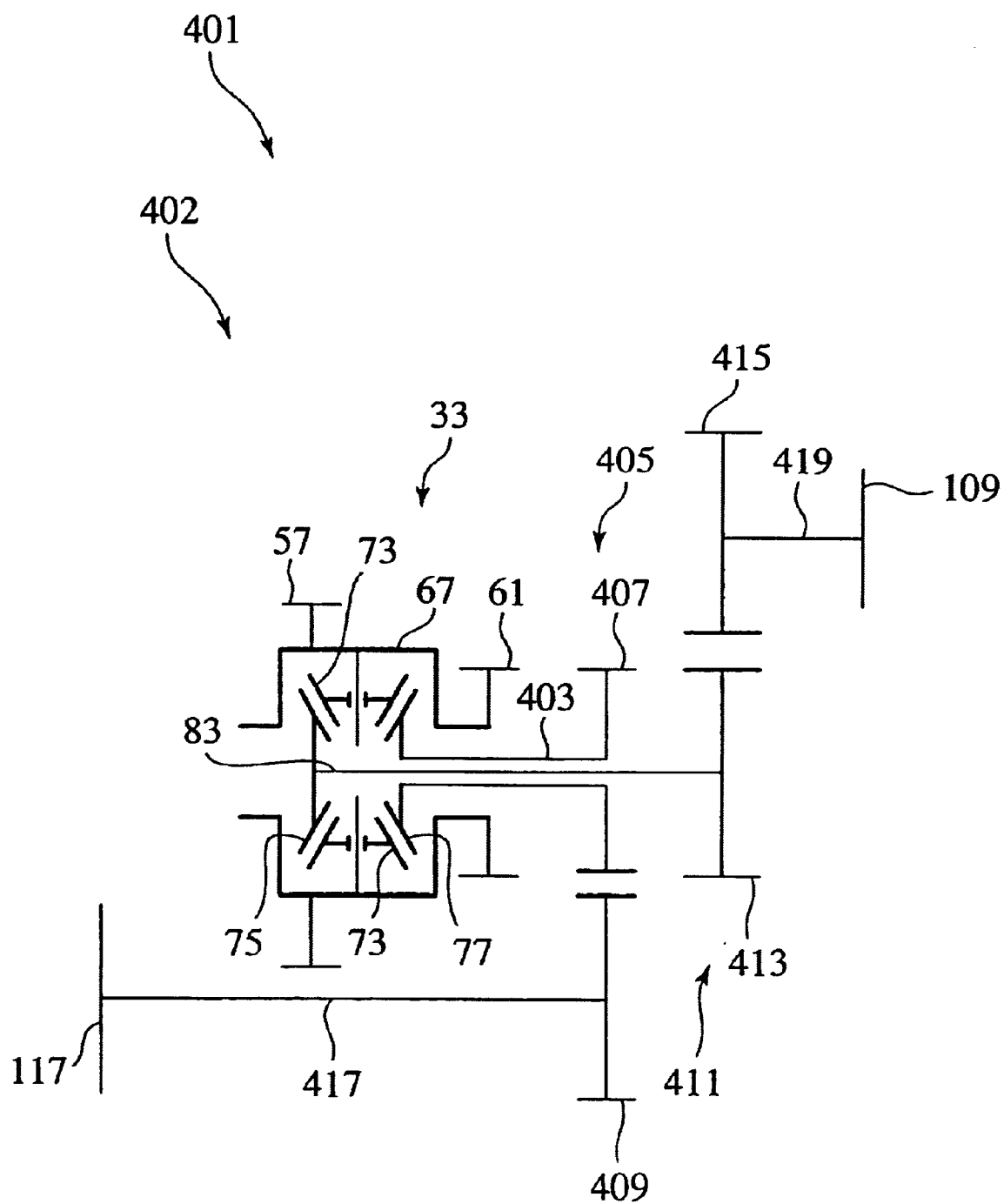
FIG. 6 is a skeleton representation of a power distribution apparatus constituting part of a fourth embodiment of the present invention.

The power transmission apparatus 501 is a variation of the power transmission apparatus 401 in FIG. 6 and is changed in the structure of the difference limiting mechanism. The difference is described below.

A drive shaft 83 connected with a side gear 75 of a center differential 33 extends through a differential case 67 in the forward direction. Outside the center differential 33, the differential case 67 and a difference limiting mechanism 503 in a unit provided at the front end of the drive shaft 83 or a rotation difference sensitive clutch 505 in a unit are attached.

The difference limiting mechanism 503 has a multiple disk clutch and an actuator for opening or closing the clutch.

As described above, the actuator may be a fluid pressure actuator such as a hydraulic actuator, electromagnet or electric motor.

The rotation difference sensitive clutch 505 is a difference limiting mechanism providing speed-sensitive difference limiting function by which as differential rotation is increased, difference limiting force is increased by shearing resistance of viscous fluid.

Activating the difference limiting mechanism 503 by the actuator prevents the wheels from skidding even on bad roads or low μ roads, thereby improving performances in bad road running, starting, acceleration, straight running ability and the stability of the vehicle.

Stopping the activation of the difference limiting mechanism 503 improves head rotation and turning of the vehicle, improving fuel consumption of the motor 701.

Adjustment of the difference limiting force of the difference limiting mechanism 503 by the actuator in accordance with changes in road conditions, steering conditions, or acceleration conditions allows the selection of optimum conditions among the improved effects in performances in bad road running, starting, acceleration, straight running ability, and the stability of the vehicle, which are obtained when the difference is limited, and the improved effects in performances in head rotation, turning and fuel consumption, which are obtained when the difference is allowed.

The rotation difference sensitive clutch 505 transmits larger drive force as the idle rotation speed of the idling wheels increases to the gripped wheels even on bad roads or low μ roads, unlike a torque sensitive difference limiting mechanism, to prevent the vehicle from being stuck on bad roads, thereby improving performances in running and escaping.

The power transmission apparatus 501 is thus constituted.

The power transmission apparatus 501 has the difference limiting mechanism 503 disposed outside the center differential 33, so that pressure line to the fluid pressure actuator or lead wires to the electromagnet and the electric motor do not interfere with the center differential 33, facilitating piping and wiring thereof, giving advantages in layout.

The difference limiting mechanism 503 and the rotation difference sensitive clutch 505 in a unit mounted outside the center differential 33 can be individually removed, facilitating maintenance thereof.

The power transmission apparatus 501 has the same effects as those of the power transmission apparatus 401 in addition to the effects of disposing the difference limiting mechanism 503 and the rotation difference sensitive clutch 505 in a unit outside the center differential 33.

Sixth Embodiment

A power transmission apparatus 601 according to a sixth embodiment of the present invention is illustrated in FIGS. 6 and 9.

Figure 8:
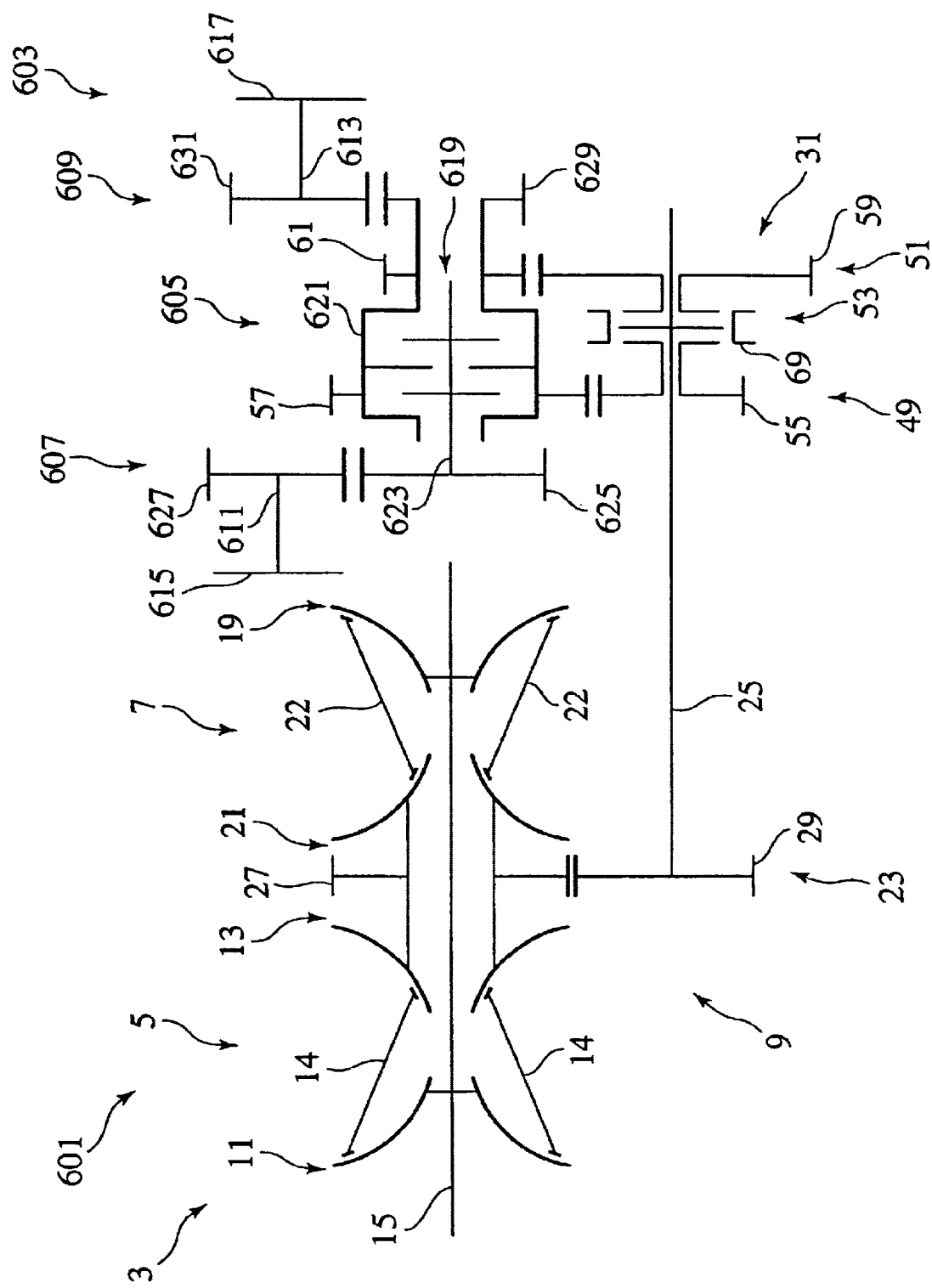
FIG. 8 is a skeleton representation of a sixth embodiment of the present invention.

The power transmission apparatus 601 has the features of the first, second, third, fourth, ninth, tenth, eleventh, twelfth, thirteenth, and fifteenth aspects of the present invention. As shown in FIG. 8, the power transmission apparatus 601 has a power distribution apparatus 603 assembled together with a stepless toroidal transmission 603. In FIG. 8, the left side is the forward end (motor 701 end) of the vehicle, and elements not assigned reference numerals have not been shown.

The power transmission apparatus 601 has the stepless toroidal transmission 3, an interconnecting Hi(high)-Lo (low) shift mechanism 31, a clutch mechanism 605 (coupling: torque controlling coupling), output gear sets 607 and 609, connection shafts 611 and 613 (power takeout shaft), and flanges 615 and 617.

The clutch mechanism 605 has a multiple disc clutch 619 and an actuator for opening or closing the clutch 619.

The multiple disc clutch 619 is disposed between a case 621 (input end member) and a shaft 623 and is opened or closed by the actuator.

The actuator may be a fluid pressure actuator such as a hydraulic actuator or an actuator with an electromagnet or an electric motor.

Gears 57 and 61 of the Hi-Lo shift mechanism 31 are fixed to the case 621. The case 621 is rotated via the Hi-Lo shift mechanism 31.

The output gear set 607 is constituted with mutually engaging gears 625 and 627, and the output gear set 609 is constituted with mutually engaging gears 629 and 631.

The output gear sets 607 and 609 are disposed on axially opposite sides of the clutch mechanism 605.

The output gear sets 607 and 609 may be provided on the radially same position (coaxially) or may be positioned on radially different positions.

The gear 625 of the output gear set 607 is connected to the shaft 623 of the clutch mechanism 605. The gear 627 is connected to the connection shaft 611 and the flange 615 is connected to the connection shaft 611. The flange 615 is connected to a front differential 705 via a propeller shaft 703, so that drive power is transmitted to the front wheels via the clutch mechanism 605.

The gear 629 of the output gear set 609 is connected to the case 621 of the clutch mechanism 605. The gear 631 is connected to the connection shaft 613, and the flange 617 is connected to the connection shaft 613. The flange 617 is connected to a rear differential 717 via a propeller shaft 715 for the rear wheels, so that the rear wheels are directly connected.

Drive power of the motor 701 for rotating a sub-shaft 25 of the stepless toroidal transmission 3 is transmitted from the Hi-lo shift mechanism 31 to the clutch mechanism 605, and then from the case 621 via the gear set 609, the connection shaft 613 and the flange 617 to the rear wheels.

When the actuator closes the multiple disc clutch 619, drive power is transmitted from the shaft 623 via the gear set 607, the connection shaft 611 and the flange 615 to the front wheels, to make the vehicle in a four-wheel driving state.

In a four-wheel driving state, difference in rotation between the front and rear wheels are avoided even on bad roads or low μ roads, which improves performances in running on bad roads, starting, acceleration, straight running ability, and the stability of the vehicle.

When pressure force of the actuator is changed while the clutch mechanism 605 is closed, the multiple disc clutch 619 is changed in sliding, which provides differentiating function between the front and rear wheels to enable controlling drive force transmitted to the front wheels.

When the multiple disc clutch 619 is adjusted in sliding in accordance with changes in road conditions, steering conditions or acceleration conditions, the differentiating function changes the power of drive force transmitted to the front wheels, enabling controlling the driving force distribution rate between the front and rear wheels to the optimum value, thereby largely improving performances in power, running on bad roads, straight running ability, and turning on bad roads.

When the actuator opens the multiple disc clutch 619, the front wheels are disconnected to make the vehicle in a two-wheel driving state, which improves performances in head rotation or turning and also improving fuel consumption of the motor 701.

The power transmission apparatus 601 is thus constituted

The power transmission apparatus 601 provides differentiating function between the front and rear wheels by the clutch mechanism 605 as described above. Controlling the driving force distribution rare between the front and rear wheels according to changes in road conditions, steering conditions or acceleration conditions to the optimum value can control difference, or makes it possible to select optimum conditions among improved effects in running on bad roads, starting, straight running ability, acceleration, and the stability of the vehicle, which are achieved when the difference is locked, and improved effects in bead rotation, turning and the fuel consumption, which are achieved when the difference is allowed.

Disconnection of the clutch mechanism 605 can switch into a two-wheel driving state upon a demand, enabling such running as with part-time four-wheel drive vehicles.

The use of the clutch mechanism 605 which is smaller in size and weight than the differential mechanism makes the power transmission apparatus 601 compact and lightweight, improving mountability thereof.

The power transmission apparatus 601 has effects similar to those of the power transmission apparatus 1 in addition to the effect of using the clutch mechanism 605 instead of the center differential 33.

The above-described embodiments show the power transmission apparatus disposed in the longitudinal direction of the vehicle. It is also possible to dispose the power transmission apparatus of the present invention in the transverse direction.

In the present invention, the differential mechanism is not limited to the bevel gear differential mechanism. It is possible to use any of a planetary gear differential mechanism, a differential mechanim with a pinion gear slidably held in an accommodating hole of a differential case connecting the side gear to the output, and a differential gear with a worm gear.

The differential mechanism is not limited to gears and can be made of a pair of friction clutches, for example.

The clutch constituting the difference limitingling mechanism may be a friction clutch or an engaging clutch as described above.

The friction clutch may be a multiple disk clutch, a single disc clutch, or a cone clutch, and also may be of wet type or dry type.

In the present invention, the difference limiting is an idea including locking difference.

The actuator for the difference limiting mechanism may be a fluid pressure actuator, an actuator with electromagnet, or an actuator converting the rotation of an electric motor into operating force, reducing the speed as described above.

The output shafts of the power distribution apparatus to the front wheels and rear wheels may be provided on the radially same position as shown in FIG. 3.

For the coupling constituting the invention according to claim 9, a coupling sensitive to rotation difference by shearing resistance of viscous fluid can be used to transmit large drive power sufficient to increase idle-running speed of the wheels to the gripped wheels, thereby improving bad road running performance.

Thus using the coupling sensitive to rotation difference not having any actuator can make the power transmission apparatus smaller in size and weight further.

The rotation difference sensitive coupling is not limited to the one utilizing shearing resistance of fluid but can be one driving a pump by differential rotation to press a friction clutch so as to obtain difference limiting force through the pumping work and the frictional resistance of a friction clutch.

If an on-off switching coupling for interrupting torque transmitted to one-end wheels is used for the coupling, it becomes possible to select between a four-wheel driving state and a two-wheel driving state upon a demand. The switching coupling is small and lightweight like the rotation difference sensitive coupling, making the power transmission apparatus smaller in size and weight.

According to the structure of the power transmission apparatus of the present invention, the power distribution apparatus can be attached to any sub-shaft transmission apparatus in any fashion such as a transmission mechanism made of a combination of a multiple disc clutch and a planetary gear set, instead of a stepless toroidal transmission mechanism, which provides the same effects as those of the above embodiments.

As the difference limiting mechanism or the clutch mechanism, a coupling can be used, being constituted with a main clutch disposed between differential rotational members of a differential device or between torque transmission members, a pilot clutch controlled by electromagnet and a cam mechanism actuated through differential torque or transmission torque to press the main clutch for closing.

In this structure, when the main clutch is closed, the resultant frictional resistance limit differentiation of the differential device, and drive power of the motor is transmitted to the wheels to make the vehicle in a four-wheel driving state.

When exciting current of the electromagnet is controlled while the main clutch is connected, the pilot clutch is changed in sliding, resulting in change in differential torque or transmission torque acting on the cam mechanism to change the cam thrust force, whereby the main clutch (coupling) is adjusted in connection force (frictional resistance).

Such adjustment of connection force of the main clutch in accordance with running conditions of the vehicle or road conditions changes the magnitude of difference limiting force or drive force transmitted to the wheels near the clutch mechanism, thereby controlling the driving force distribution rate between the front and rear wheels to the optimum value, resulting in large improvement in performances in power, bad road running, straight running ability, turning on bad roads.

Disconnection of the clutch mechanism allows differentiation of the differencial device, disconnecting the wheels near the connection shaft to make the vehicle in a two-wheel driving state, thereby improving performances in turning, head rotation and fuel consumption.

According to this structure, connection force of the main clutch is amplified via the cam mechanism to provide large clutch capacitance even with the small and lightweight main clutch, so that sufficient difference limiting force with the power transmission apparatus configured small and lightweight, and sufficient drive force is transmitted to the wheels to largerly improve power performance of the vehicle.

The small and lightweight power transmission apparatus further improves its mountability.

The present invention can be applied to any use for distributing drive power to the steering wheels and the driving wheels in addition to a power transmission apparatus of a four-wheel driving vehicle. For example, the invention can be applied to a six-wheel vehicle or a vehicle with crawlers.

While preferred embodiments of the present invention have been described using specific terms, such description is for illustrative purposes, and it is to be understood that changes and variations may be made without departing from the spirit or scope of the following claims.

What is claimed is:

1. A power transmission apparatus comprising:
a transmission apparatus for outputting drive power of a motor from an input shaft, via a transmission mechanism disposed coaxially therewith, to a sub-shaft disposed in parallel thereto; and
a power distribution apparatus disposed in parallel to the sub-shaft, for transmitting rotation of an input end member linked to an end of the sub-shaft, via respective output shafts, to a front-wheel and a rear-wheel end, wherein
at least the sub-shaft and the input end member are disposed in an axially overlapping relationship,
wherein the respective output shafts at the front wheel end and the rear wheel end of the power distribution apparatus are linked to power takeout shafts disposed in parallel thereto, respectively, and drive power is transmitted via the power takeout shafts to the front-wheel end and the rear-wheel end.

2. A power transmission apparatus according to claim 1, wherein the power distribution apparatus and the sub-shaft are disposed in an axially overlapping relationship.

3. A power transmission apparatus according to claim 1, wherein the sub-shaft and the input end member are linked via a speed changing mechanism, and the speed changing mechanism comprises a plurality of stages of gear sets operative for a speed change by an operation mechanism.

4. A power transmission apparatus according to claim 3, wherein the speed changing mechanism has operation means disposed coaxially with the sub-shaft.

5. A power transmission apparatus according to claim 1, wherein the power distribution apparatus has a differential mechanism for allowing differential rotation between the respective output shafts.

6. A power transmission apparatus according to claim 5, wherein a difference limiting mechanism for limiting the differential rotation of the differential mechanism is disposed coaxially with the power distribution apparatus.

7. A power transmission apparatus according to claim 6, wherein the difference limiting mechanism comprises a clutch mechanism for locking the differential rotation.

8. A power transmission apparatus according to claim 6, wherein the difference limiting mechanism is disposed serially to the power distribution apparatus.

9. A power transmission apparatus according to claim 1, wherein the power distribution apparatus comprises a coupling adapted at one output shaft end for normally transmitting drive power and at another output shaft end for intermittently transmitting drive power as necessary.

10. A power transmission apparatus according to claim 1, wherein an interconnection between the front wheel end output shaft and the power takeout shaft thereof and an interconnection between the rear wheel end output shaft and the power takeout shaft thereof are made at locations radially different with respect to a rotation axis of the power distribution apparatus.

11. A power transmission apparatus according to claim 1, wherein the front wheel end output shaft and the rear wheel output shaft of the power distribution apparatus are disposed axially at both sides of the power distribution apparatus, and linked to the power takeout shafts respectively.

12. A power transmission apparatus according to claim 11, wherein the front wheel end output shaft of the power distribution apparatus is disposed axially at the front wheel end and the rear wheel end output shaft of the power distribution apparatus is disposed axially at the rear wheel end, to be linked to the power takeout shafts respectively.

13. A power transmission apparatus according to claim 1, wherein the front wheel end output shaft and the rear wheel end output shaft of the power distribution apparatus are disposed axially at one end of the power distribution apparatus, to be linked to the power takeout shafts respectively.

14. A power transmission apparatus according to claim 1, wherein the speed changing mechanism of the transmission apparatus comprises a stepless toroidal transmission configured with an input disc linked to the input shaft, an output disc linked to a transmission member at an output end, and a friction roller contacting the discs, for rotation of the input disc to be changed in speed by a rocking operation of the friction roller and transmitted to the output disc, and the power distribution apparatus is disposed for a linking in which directions of rotation of the power takeout shafts of the front wheel end output shaft and the rear wheel end output shaft and the sub-shaft are identical.

15. A power transmission apparatus comprising:
a transmission apparatus for outputting drive power of a motor from an input shaft, via a transmission mechanism disposed coaxially therewith, to a sub-shaft disposed in parallel thereto; and
a power distribution apparatus disposed in parallel to the sub-shaft, for transmitting rotation of an input end member linked to an end of the sub-shaft, via respective output shafts, to a front wheel end and a rear wheel end, wherein
at least the sub-shaft and the input end member are disposed in an axially overlapping relationship,
wherein the power distribution apparatus comprises a coupling adapted at one output shaft end for normally transmitting drive power and at another output shaft end for intermittently transmitting drive power as necessary.

16. A power transmission apparatus according to claim 15, wherein the power distribution apparatus and the sub-shaft are disposed in an axially overlapping relationship.

17. A power transmission apparatus according to claim 15, wherein the sub-shaft and the input end member are linked via a speed changing mechanism, and the speed changing mechanism comprises a plurality of stages of gear sets operative for a speed change by an operation mechanism.

18. A power transmission apparatus according to claim 17, wherein the speed changing mechanism has operation means disposed coaxially with the sub-shaft.

* * * * *